(12) United States Patent
Lee et al.

(10) Patent No.: US 12,452,651 B2
(45) Date of Patent: Oct. 21, 2025

(54) METHOD AND DEVICE FOR ACTIVATING 5G USER

(71) Applicant: Samsung Electronics Co., Ltd., Gyeonggi-do (KR)

(72) Inventors: Jicheol Lee, Gyeonggi-do (KR); Jungje Son, Gyeonggi-do (KR); Sangsoo Jeong, Gyeonggi-do (KR); Sunghoon Kim, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 550 days.

(21) Appl. No.: 17/760,632

(22) PCT Filed: Sep. 28, 2020

(86) PCT No.: PCT/KR2020/013206
§ 371 (c)(1),
(2) Date: Mar. 15, 2022

(87) PCT Pub. No.: WO2021/066452
PCT Pub. Date: Apr. 8, 2021

(65) Prior Publication Data
US 2022/0338000 A1 Oct. 20, 2022

(30) Foreign Application Priority Data
Oct. 4, 2019 (KR) .................. 10-2019-0123297
Aug. 12, 2020 (KR) .................. 10-2020-0101275

(51) Int. Cl.
*H04W 8/26* (2009.01)
*H04W 12/06* (2021.01)
(Continued)

(52) U.S. Cl.
CPC ........... *H04W 8/265* (2013.01); *H04W 12/06* (2013.01); *H04W 12/71* (2021.01); *H04W 12/72* (2021.01)

(58) Field of Classification Search
CPC ..... H04W 12/71; H04W 8/265; H04W 12/72; H04W 12/06
See application file for complete search history.

(56) References Cited

U.S. PATENT DOCUMENTS 8,943,321 B2 1/2015 Holtmanns et al.
10,237,681 B2 3/2019 Kim et al.
(Continued)

FOREIGN PATENT DOCUMENTS

CN 102550001 7/2012
CN 109286567 1/2019
(Continued)

OTHER PUBLICATIONS

CN110247849A Machine English Translation (Year: 2019).*
(Continued)

*Primary Examiner* — James P Duffy
(74) *Attorney, Agent, or Firm* — The Farrell Law Firm, P.C.

(57) ABSTRACT

The present disclosure relates to: a communication technique for converging, with IoT technology, a 5th generation (5G) or pre-5G communication system for supporting a higher data transfer rate beyond the 4th generation (4G) communication system such as long term evolution (LTE); and a system therefor. The present disclosure may be applied to intelligent services (for example, smart homes, smart buildings, smart cities, smart cars or connected cars, healthcare, digital education, retail businesses, security and safety-related services, etc.) on the basis of 5G communication technology and IoT-related technology. According to vari- (Continued)

ous embodiments of the present invention, a method for activating a 5G user through a subscriber terminal can be provided.

6 Claims, 13 Drawing Sheets

(51) Int. Cl.
*H04W 12/71* (2021.01)
*H04W 12/72* (2021.01)

(56) References Cited

U.S. PATENT DOCUMENTS

| | | | |
|---|---|---|---|
| 10,588,085 | B2 | 3/2020 | Kim et al. |
| 10,602,472 | B2 | 3/2020 | Lee et al. |
| 10,716,002 | B2 | 7/2020 | Rajadurai et al. |
| 11,469,994 | B2 | 10/2022 | Wang |
| 2019/0110238 | A1 | 4/2019 | Buckley |
| 2019/0335332 | A1 | 10/2019 | Ying et al. |
| 2020/0053547 | A1 | 2/2020 | Baek et al. |
| 2020/0053802 | A1 | 2/2020 | Li et al. |
| 2020/0068385 | A1 | 2/2020 | Yu |
| 2020/0245404 | A1 | 7/2020 | Suh et al. |
| 2020/0374698 | A1 | 11/2020 | Ying et al. |
| 2021/0266410 | A1 | 8/2021 | Lee |

FOREIGN PATENT DOCUMENTS

| | | |
|---|---|---|
| CN | 109417709 | 3/2019 |
| CN | 109644516 | 4/2019 |
| CN | 110167025 | 8/2019 |
| CN | 110247849 | 9/2019 |
| CN | 110247849 A * | 9/2019 |
| CN | 110249667 | 9/2019 |
| EP | 3 720 048 | 10/2020 |
| EP | 3 216 305 | 1/2022 |
| KR | 1020170138255 | 12/2017 |
| KR | 10-2018-0014421 | 2/2018 |
| KR | 10-2019-0098520 | 8/2019 |
| WO | WO 2016/072814 | 5/2016 |
| WO | WO 2018/067956 | 4/2018 |
| WO | WO 2018/126534 | 7/2018 |
| WO | WO 2019/031912 | 2/2019 |
| WO | WO 2019/033920 | 2/2019 |
| WO | WO 2019/114684 | 6/2019 |
| WO | WO 2019/166081 | 9/2019 |

OTHER PUBLICATIONS

3GPP TS 23.503, V15.7.0, (Sep. 2019), "Policy and Charging Control Framework for the 5G System (5GS)". (Year: 2019).*
ETSI TS 123 503 V15.3.0, 5G; Policy and Charging Control Framework for the 5G System; Stage 2 (3GPP TS 23.503 Version 15.3.0 Release 15), Sep. 2018, 73 pgs.
Chinese Office Action dated Sep. 28, 2023 issued in counterpart application No. 202080068634.4, 16 pages.
European Search Report dated Oct. 17, 2023 issued in counterpart application No. 23159284.1-1216, 13 pages.
PCT/ISA/210 Search Report issued on PCT/KR2020/013206, Jan. 12, 2021 pp. 5.
PCT/ISA/237 Written Opinion issued on PCT/KR2020/013206, Jan. 12, 2021, pp. 4.
3GPP TR 22.904 V16.1.0 (Sep. 21, 2018) Technical Specification 3rd Generation Partnership Project; Technical Specification Group Services and System Aspects.
Study on user centric identifiers and authentication (Release 16), pp. 20.
3GPP TS 22.101 V18.2.0 (Sep. 24, 2021) Technical Specification 3rd Generation Partnership Project; Technical Specification Group Services and System Aspects.
Service aspects; Service principles (Release 18), pp. 103.
3GPP TS 22.115 V16.1.0 (Sep. 21, 2018) Technical Specification 3rd Generation Partnership Project; Technical Specification Group Services and System Aspects.
Service aspects; Charging and billing (Release 16), pp. 32.
SA WG1, 3GPP TSG SA Meeting #78 TD SP-170995 Lisbon, PT, Dec. 20-22, 2017, "New WID on Study on Layer for User Centric Identifiers and Authentication", pp. 3.
SA WG1, 3GPP TSG-SA Meeting #80 SP-180328 La Jolla, Ca, United States, Jun. 13-15, 2018, "New WID on User Identities and Authentication (UIA)", pp. 3.
3GPP Ts 23.501 V16.1.0 (Jun. 11, 2019) Technical Specification 3rd Generation Partnership Project; Technical Specification Group Services and System Aspects.
System Architecture for the 5G System; Stage 2 (Release 16), pp. 367.
3GPP TS 23.380 V16.0.0 (Mar. 22, 2019) Technical Specification 3rd Generation Partnership Project; Technical Specification Group Core Network and Terminals.
IMS Restoration Procedures (Release 16), pp. 54.
3GPP TS 23.502 V16.1.1 (Jun. 11, 2019) Technical Specification 3rd Generation Partnership Project; Technical Specification Group Services and System Aspects.
Procedures for the 5G System; Stage 2 (Release 16), pp. 494.
3GPP TS 33.501 V15.5.0 (Jun. 13, 2019) Technical Specification 3rd Generation Partnership Project; Technical Specification Group Services and System Aspects.
Security architecture and procedures for 5G system (Release 15), pp. 190.
3GPP TR 33.899 V1.3.0, 3GPP, 3rd Generation Partnership Project; Technical Specification Group Services and System Aspects; Study on the Security Aspects of the Next Generation System (Release 14), Aug. 2017, 605 pages.
European Search Report dated Sep. 1, 2022 issued in counterpart application No. 20871545.8-1216, 12 pages.
Chinese Office Action dated Jun. 19, 2024 issued in counterpart application No. 202080068634.4, 12 pages.
Chinese Office Action dated Nov. 13, 2024 issued in counterpart application No. 202080068634.4, 12 pages.

* cited by examiner

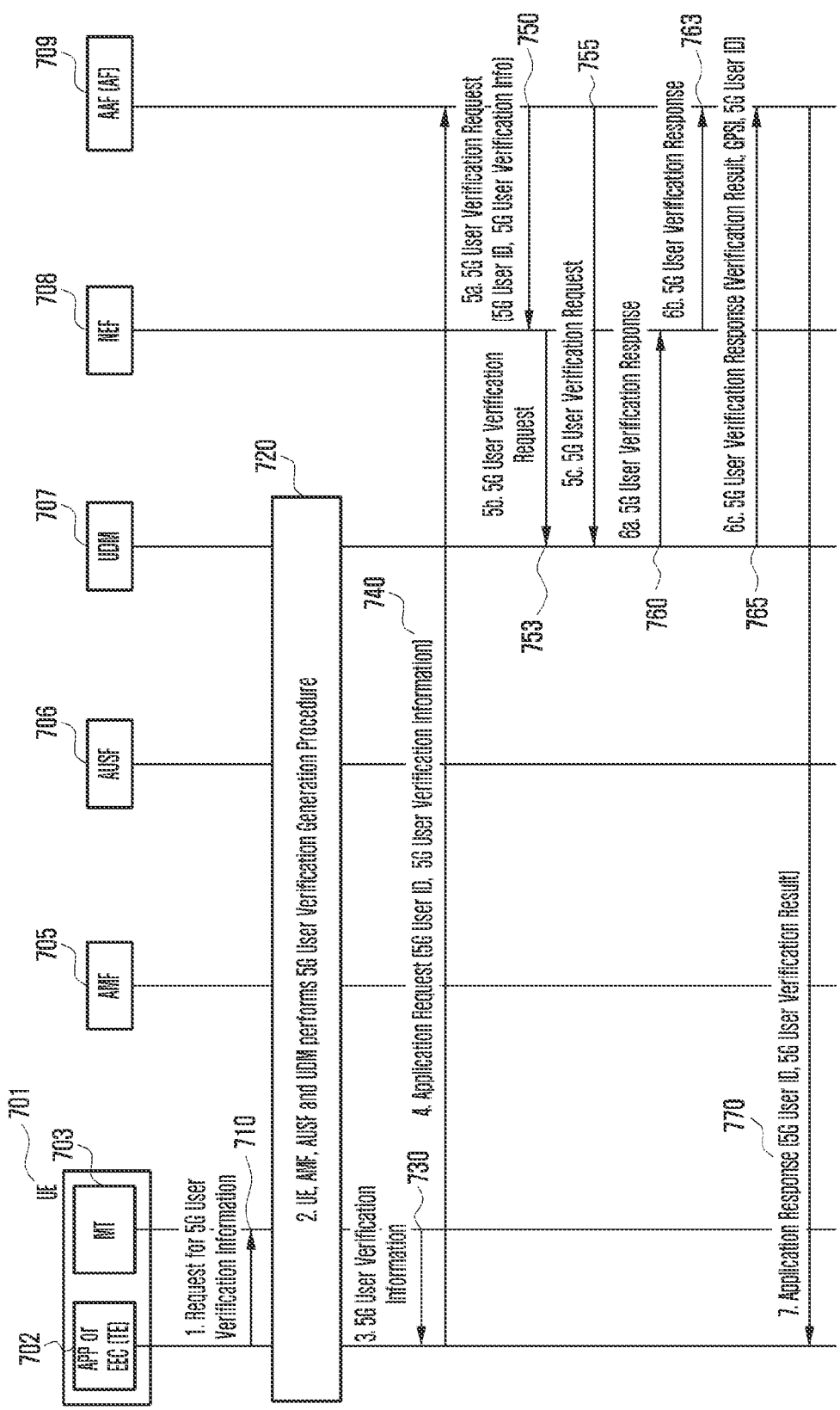

METHOD AND DEVICE FOR ACTIVATING 5G USER

PRIORITY

This application is a National Phase Entry of PCT International Application No. PCT/KR2020/013206, which was filed on Sep. 28, 2020, and claims priority to Korean Patent Applications No. 10-2019-0123297 and 10-2020-0101275, which were filed on Oct. 4, 2019 and Aug. 12, 2020, respectively, the entire content of each of which is incorporated herein by reference.

TECHNICAL FIELD

The disclosure relates to a wireless communication system and, more particularly, to a method for activating a 5G user through a subscriber terminal in a cellular mobile communication system (5G system).

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" communication system or a "post long term evolution (post LTE)" system.

The 5G communication system is considered to be implemented in ultra-higher frequency (mmWave) bands (e.g., 60 GHz bands) so as to accomplish higher data rates. To decrease propagation loss of the radio waves and increase the transmission distance in the ultra-higher frequency bands, beamforming, massive multiple-input multiple-output (MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

For the 5G system, studies are being conducted to support a wider variety of services than the existing 4G system. For example, the most representative services of the 5G system include an enhanced mobile broadband (eMBB) service, an ultra-reliable and low latency communication (URLLC) service, a massive machine type communication (mMTC) service, an evolved multimedia broadcast/multicast service (eMBMS), and the like. Further, a system for providing the URLLC service may be referred to as a URLLC system, and a system for providing the eMBB service may be referred to as an eMBB system. In addition, the terms "service" and "system" may be used interchangeably.

Among these services, the URLLC service is a service that is newly considered in the 5G system, in contrast to the existing 4G system, and requires to satisfy ultrahigh reliability (e.g., packet error rate of about 10-5) and low latency (e.g., about 0.5 msec) conditions compared to the other services. In order to satisfy such strict requirements, the URLLC service may need to apply a transmission time interval (TTI) that is shorter than that of the eMBB service, and various operating methods using this are under consideration.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Meanwhile, 3GPP which is in charge of cellular mobile communication standards has named a new core network structure 5G core (5GC) and conducted standardization in order to accomplish evolution from existing 4G LTE systems to 5G systems.

5GC supports differentiated functions as follows, compared with the evolved packet core (EPC) which is a network core for existing 4G.

Firstly, a network slice function is introduced in 5GC. As 5G requirements, 5GC needs to support various kinds of terminal types and services. Examples are enhanced mobile broadband (eMBB), ultra reliable low latency communications (URLLC), and massive machine type communications (mMTC). Such terminals/services have different requirements for respective core networks. For example, an eMBB service requires a high data rate, and a URLLC service requires high stability and low latency. A technology proposed to satisfy such various service requirements is a network slice scheme.

The network slice scheme obtains multiple logical network through virtualization of a single physical network, and each network slice instance (NSI) may have a different characteristic. Therefore, each NSI has a network function (NF) appropriate for the characteristic, thereby satisfying various service requirements. An NSI appropriate for the characteristic of a require service may be allocated to each terminal, thereby efficiently supporting various 5G services.

Secondly, 5GC may facilitate network virtualization support by separating a mobility management function and a session management function. In existing 4G LTE, every terminal can receive services from networks through signaling exchange with single core equipment referred to as mobility management entity (MME) which is in charge of registration, authentication, mobility management, and session management functions. However, 5G has an exponentially increased number of terminals and detailed classification of mobility and traffic/session characteristics that are to be supported according to the terminal type, and if single equipment such as MME supports all functions, the scalability for adding an entity for each necessary function is inevitably degraded. Therefore, there is ongoing development of various functions based on a structure which separates the mobility management function and the session management function in order to improve expandability in terms of signaling load and function/implementation complexity of core equipment that is I charge of the control plane.

DISCLOSURE OF INVENTION

Technical Problem

In current 5G systems, a right regarding a terminal is assigned from subscriber information of the terminal. A problem to be solved by the disclosure is enable a 5G system to generate a user identifier, to provide optimization performance regarding a more improved user experience by using the same, and to provide a service to devices and a user other than a 3GPP operator. For example, network configuration information may be changed through a user identifier regardless of subscriber information, and a different service may be provided according to the user's request. In the disclosure, a user may be a person who uses a subscriber terminal, an application program executed by a terminal, an application program connected to a terminal, or a device connected to a gateway terminal.

The technical subjects pursued in the disclosure may not be limited to the above mentioned technical subjects, and other technical subjects which are not mentioned may be clearly understood, through the following descriptions, by those skilled in the art to which the disclosure pertains.

Solution to Problem

In accordance with an aspect, a method performed by a core network entity in a wireless communication system according to an embodiment of the disclosure may include: receiving, from a first terminal, a first message requesting authentication of a second terminal including an identifier of the second terminal that has requested a connection to the first terminal; determining whether the second terminal can be connected to the first terminal based on at least one of information on the first terminal, information on the second terminal, or authentication information on the second terminal obtained from a unified data management (UDM); and
transmitting, to the first terminal, a second message including an authentication result in case that the second terminal can be connected to the first terminal.

In addition, the core network entity may be an access and mobility management function (AMF) or a session management function (SMF).

In addition, the method may further include transmitting a third message requesting the information on the first terminal to the UDM; and receiving a fourth message including the information on the first terminal from the UDM.

In addition, the method may further include performing authentication of the second terminal with a server; and receiving, from the server, a response message including the authentication information for the second terminal.

In addition, the method may further include transmitting a fifth message requesting the information on the second terminal to a network entity associated with the second terminal; and receiving a sixth message including the information on the second terminal from the network entity associated with the second terminal.

In addition, the network entity associated with the second terminal may be at least one of the UDM, a policy and control function (PCF), or a UDM associated with the second terminal.

In accordance with another aspect, a core network entity in a wireless communication system according to an embodiment of the disclosure may include: a transceiver; and a controller configured to: receive, from a first terminal through the transceiver, a first message requesting authentication of a second terminal including an identifier of the second terminal that has requested a connection to the first terminal, determine whether the second terminal can be connected to the first terminal based on at least one of information on the first terminal, information on the second terminal, or authentication information on the second terminal obtained from a unified data management (UDM), and transmit, to the first terminal through the transceiver, a second message including an authentication result in case that the second terminal can be connected to the first terminal.

Advantageous Effects of Invention

If a terminal requests activation of 5G user ID at the request of an application program in the terminal or the user, an AMF may confirm whether the user is an authorized user by using a UDM, may perform necessary authentication, may receive profile information regarding the 5G user ID of the terminal, and may transfer authorized profile information to the UE, thereby activating the 5G user ID.

In addition, an embodiment of the disclosure may provide a method for configuring a network by using network configuration information regarding a user ID different from subscriber information provided by a subscriber terminal. In addition, an embodiment of the disclosure may provide a function for generating connection between a subscriber terminal and a user and stopping the connection.

Advantageous effects obtainable from the disclosure may not be limited to the above mentioned effects, and other effects which are not mentioned may be clearly understood, through the following descriptions, by those skilled in the art to which the disclosure pertains.

BRIEF DESCRIPTION OF DRAWINGS

FIG. 7 is a 5G user confirmation procedure according to an embodiment of the disclosure.

MODE FOR THE INVENTION

Hereinafter, embodiments of the disclosure will be described in detail in conjunction with the accompanying drawings. Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification. In the following description, a base station is an entity that allocates resources to terminals, and may be at least one of an eNode B (eNB), a Node B, a base station (BS), a radio access network (RAN), an access network (AN), a RAN node, a NR NB, a gNB, a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink" refers to a radio link via which a base station transmits a signal to a terminal, and an "uplink" refers to a radio link via which a terminal transmits a signal to a base station. Further, in the following description of embodiments of the disclosure, LTE or LTE-A systems will be described by way of example, but the embodiments of the disclosure may be applied to other communication systems having similar technical backgrounds or channel types. In addition, based on determinations by those skilled in the art, the embodiments of the disclosure may also be applied to other communication systems through some modifications without significantly departing from the scope of the disclosure.

Figure 1:
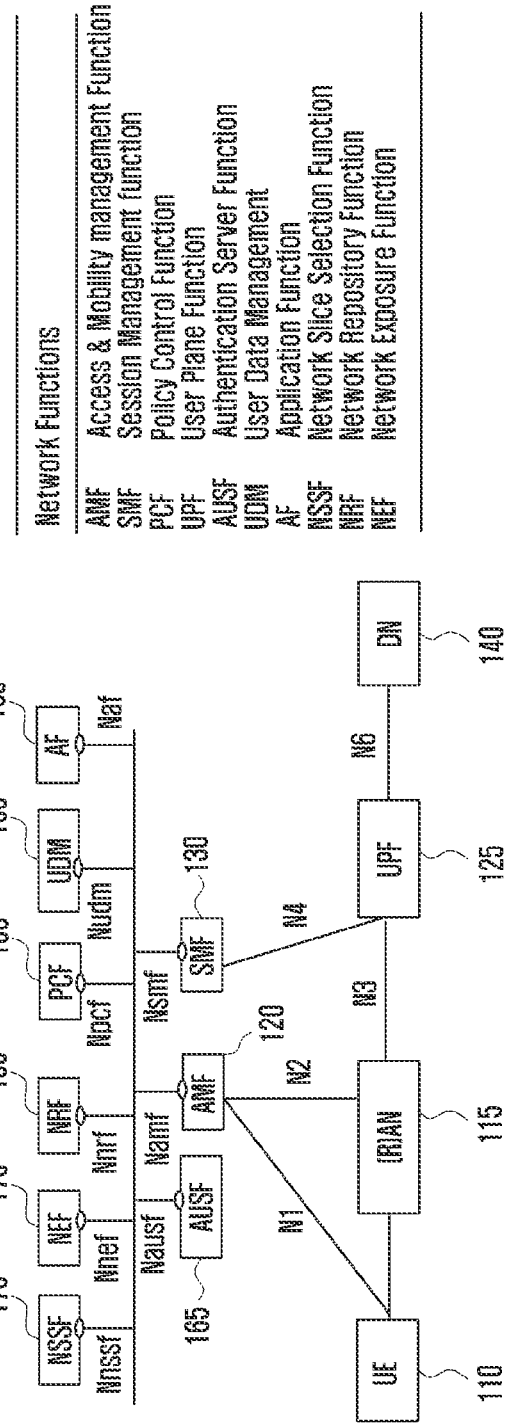
FIG. 1 is a diagram illustrating a network architecture of a 5G system according to an embodiment of the disclosure.

FIG. 1 is a diagram illustrating a network architecture of a 5G system according to an embodiment of the disclosure.

A unit for performing each function provided by the 5G network system may be defined as a network function (NF). The structure of the 5G mobile communication network is illustrated in FIG. 1. Representative NFs include an access and mobility management function (AMF) 120 for managing network access and mobility of a user equipment (UE) 110, a session management function (SMF) 130 for performing a session-related function for the UE, a user plane function (UPF) 125 which is responsible for the delivery of user data and is controlled by the SMF, an application function (AF) 180 to communicate with 5GC for provision, a network exposure function (NEF) 170 that supports communication between 5GC and AF 180, a unified data management (UDM) and unified data repository (UDR) 160 for data storage and management, a policy and control function (PCF) 150 that manages policies, and a data network (DN) 140 such as the Internet through which user data is delivered. In addition to NF, there may be an operation, administration, and management (OAM) (not illustrated) that is a system for managing a UE and a 5G mobile communication network. The session information includes QoS information, charging information, and packet processing information. In addition, the 5G network system may further include a base station 115, an authentication server function (AUSF) 165, a network slice selection function (NSSF) 175, and a network repository function (NRF) 155.

Figure 2:
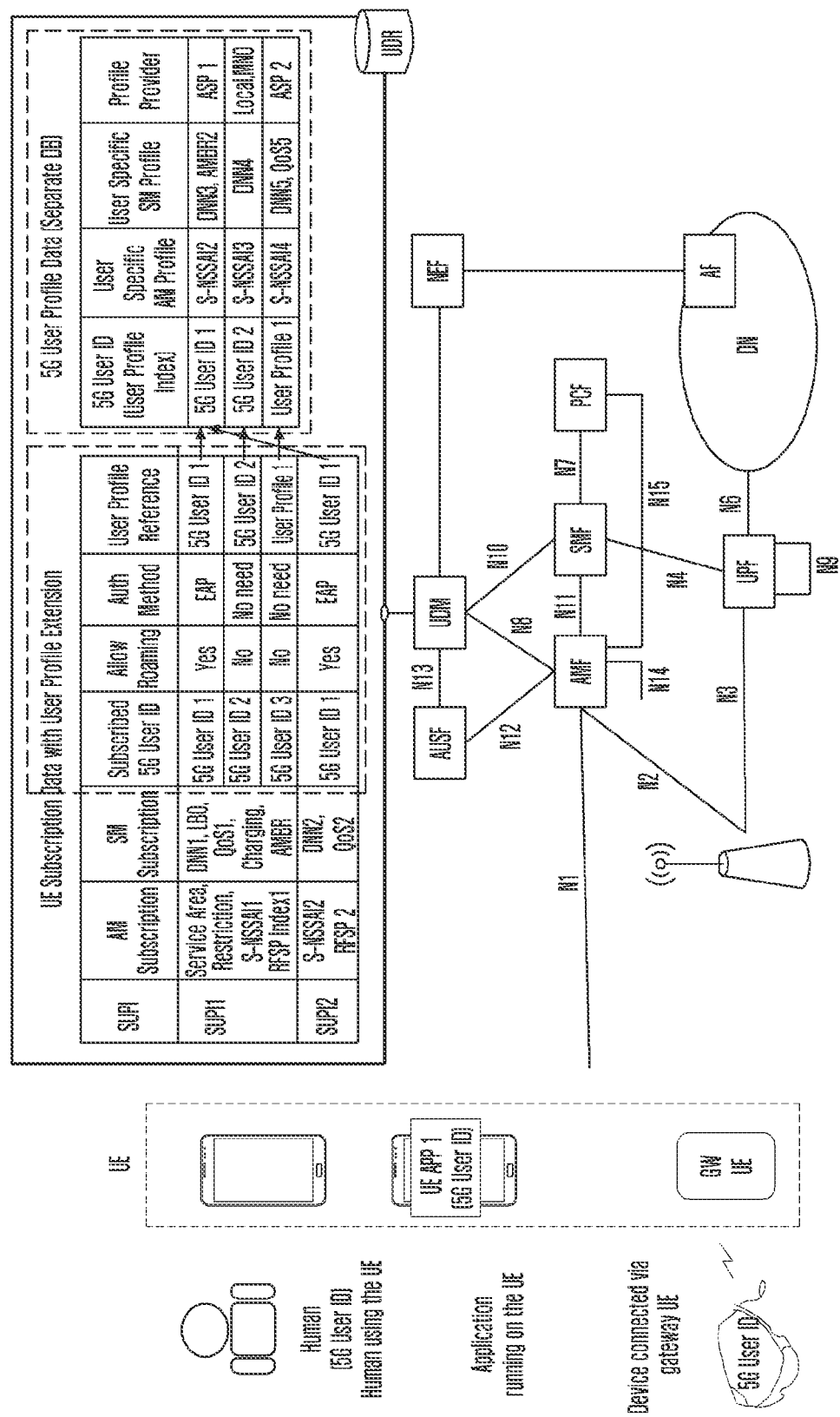
FIG. 2 is a diagram illustrating a network structure for 5G users according to an embodiment of the disclosure.

FIG. 2 is a diagram illustrating a 5G network architecture supporting a 5G user ID according to an embodiment of the disclosure.

The 5G user ID may be different from a subscription permanent identifier managed by the 5G system. In this case, the user may refer to an actual user (person) using the subscriber UE, an application operating in the UE, an application operating in connection with the UE, or a device connected to the back of the subscriber UE (e.g., a gateway UE).

The 5G user ID may be used to identify a user (person) who uses the subscriber UE. In this case, the user may identify the user through the user interface of the subscriber UE and access the 5G network through the authentication procedure or the use permission procedure required in the 5G network through the user identification information and the user's credential information. The 5G user ID may be used to identify an application running on the subscriber UE. The 5G user ID may be used to identify a device connected to the gateway UE when the subscriber UE operates as a gateway UE.

According to an embodiment, in the architecture supporting 5G users as illustrated in FIG. 2, several different users may share one subscriber UE. In addition, it is possible to provide a function of automatically changing the service configuration (i.e., user profile) preconfigured by the mobile communication service provider according to the user configuration. In order to provide this function, the user must be identified in a different way than the existing subscription identifier. The 5G user ID may be used for this purpose.

For example, in a household, a mother subscribes to an operator TTT and a son can surf the web using his mother's tablet. Both mother and son can use the Internet using the TTT operator's network. However, the mother and the son each have different user identifiers, and may have different service configurations for each user identifier. For example, when the mother applies for youth protection services, and when access is made with her son's identifier, she can protect her son from traffic to a specific site.

For example, when the son unlocks the tablet using the fingerprint sensor of the tablet (UE) and tries to use the tablet, the son may select his own user account and perform a user authentication procedure for his own user account. The user authentication procedure may be performed in the operator network and the UE.

If the user authentication is successful through the 3GPP network, the son can use the Internet. User-specific configuration (e.g., a web filter) in the operator's network may be managed separately for each user or may be linked to subscriber information subscribed by his mother.

If the son who used the Internet does not use the tablet afterwards, the tablet is automatically locked after a certain period of time, and the user's account may be deactivated.

Afterwards, when the user (son) uses the tablet again, the user account can be reactivated with a simple procedure. The network communication configurations are configured for each user, so, for example, if the son makes a call using the logged-in tablet, he can make a call to his own phone number.

Afterwards, when the mother unlocks the tablet again and selects her user account, the tablet and the network may perform authentication. In this case, service configuration information such as web filter may be re configured to the mother's user configuration information.

According to an embodiment, in an architecture supporting 5G users as illustrated in FIG. 2, a method may be provided in which an operator operates as an identity provider to enable automatic login and single sign-on to a service of the operator or a service provided by the operator's partner.

For example, the first user is a subscriber of the operator TTT and he can log in to the user account with his subscriber UE. That is, the user account of the first user may be successfully authenticated by the 3GPP system. In addition, if the first user has an account of K bank, and when the first user opens a K bank account, the K bank account may have been linked with the user account of the operator TTT.

In this case, the first user may use the first user's subscriber UE to replace the authentication required in K bank's online banking. The first user is already authenticated with the user account of the first user in the 3GPP system. based on this level of trust, the K bank system can authorize the first user's request for access to the bank account without the need for the first user to authenticate using additional credentials through the fact that the first user is using the UE to which he has subscribed, the first user authenticated the user using the user login procedure, and the subscriber UE is in the same location as the home address of the first user.

Thereafter, when the first user requests to use the transfer service through the banking system, the banking system may perform a stronger re-authentication procedure (e.g., authentication through fingerprint recognition, etc.) to confirm that the user who uses the subscriber UE in the 3GPP system is the real user.

A user profile identified by the 5G user ID may have the following attributes.

User type: user (person), application, or device connected to the backside of the gateway UE Whether and how authentication is required Scope of use: within a mobile operator or service provider identifier User-specific configuration Subscription profile information for each user: This information may be the contents or part of the subscription information for each subscriber of UDM, and more specifically, may be access and mobility subscription information such as user specific allowed area and user specific restricted area, or session management related subscription information such as user subscribed single network slice selection assistance information (S-NS-SAI) and user subscribed data network name (DNN). Subscription profile information for each user may include information such as access and mobility management (AM) subscription information and session management (SM) subscription information, as well as whether activation is allowed in a roaming operator, a list of agreed operators that can be activated, etc.

Charging profile for each user: online or offline charging method

User-specific configuration information or profile for external use

The 5G user ID disclosed in the disclosure may be managed in the form of a generic public subscription identifier (GPSI).

First Embodiment

The first embodiment of the disclosure is a method for activating a 5G user. Such a procedure follows the procedure illustrated in FIG. 3.

A user, device, or application identified by a 5G user ID may perform a 5G user activation procedure to access a mobile communication network using the mobile communication subscriber UE. This 5G user activation procedure may be performed by utilizing the registration procedure of the subscriber UE.

The subscriber UE may start the 5G user activation procedure in the following cases.

User's request for activation via the user interface (e.g., user login)

Request from a device connected to the subscriber UE

Request from an application running on the subscriber UE

Requests from an application running on devices connected to the subscriber UE

The subscriber UE may transmit an indicator for requesting 5G user activation, an identifier of the 5G user, and an identifier (e.g., subscription concealed identifier (SUCI)) of the subscriber UE to the AMF. The 5G user activation request refers to that the 5G user specified by the 5G user identifier requests permission to access the mobile communication operator network using the subscriber UE.

When the AMF receives a 5G user activation request from the subscriber UE, the AMF determines whether the 5G user can use the 5G network through the subscriber UE that has transmitted the request message.

1) The UDM may pre-store the subscribed 5G user identifier that is allowed for each subscriber UE. The AMF may determine whether to allow the requested 5G user ID activation by requesting the UDM for subscription information on the subscriber ID, and identifying whether there is the subscribed 5G user identifier information in the subscription information received from the UDM.

2) The AMF may determine whether additional authentication for the 5G user is required to activate the 5G user ID according to the operator's unique configuration (local configuration) or the configuration information included in the subscription information received through UDM. In this embodiment, the configuration information included in the subscription information corresponds to the user authentication profile. If additional authentication is required, the AMF initiates an authentication procedure for the 5G user identifier. When the authentication for the 5G user ID performed with the authentication server is successfully performed, the AMF may determine to allow the 5G user ID activation by using the subscriber UE that has transmitted the 5G user activation request message. If authentication is not successful, the AMF may reject the request to activate the 5G user ID.

3) The AMF may verify and determine additional conditions for 5G user activation from the UDM in order to determine the activation of the 5G user. Additional conditions may include accessed radio access technology (RAT) information, accessed radio frequency information, roaming status, accessed UE location information (location information on the network), accessible time information, and the maximum number of 5G users that the subscriber UE can simultaneously activate. The AMF determines whether to activate the 5G user by verifying the additional conditions.

If the AMF determines to approve the 5G user's activation request, the AMF may request a separate 5G user profile for the 5G user ID from the UDM. If the storage where the 5G user profile is stored is stored in a separate storage other than the UDM, the AMF may receive the 5G user profile information from a separate 5G user profile storage within the operator or an external storage.

When the AMF determines whether to approve the 5G user's activation request, the AMF may deliver a result (e.g., activation success/failure) for the 5G user activation request to the subscriber UE. If the 5G user activation request is successful and the UE requires a profile for the 5G user, the AMF may deliver the 5G user profile context information to the UE.

A more detailed procedure follows the procedure of FIG. 3, and the detailed procedure is as follows.

Figure 3:
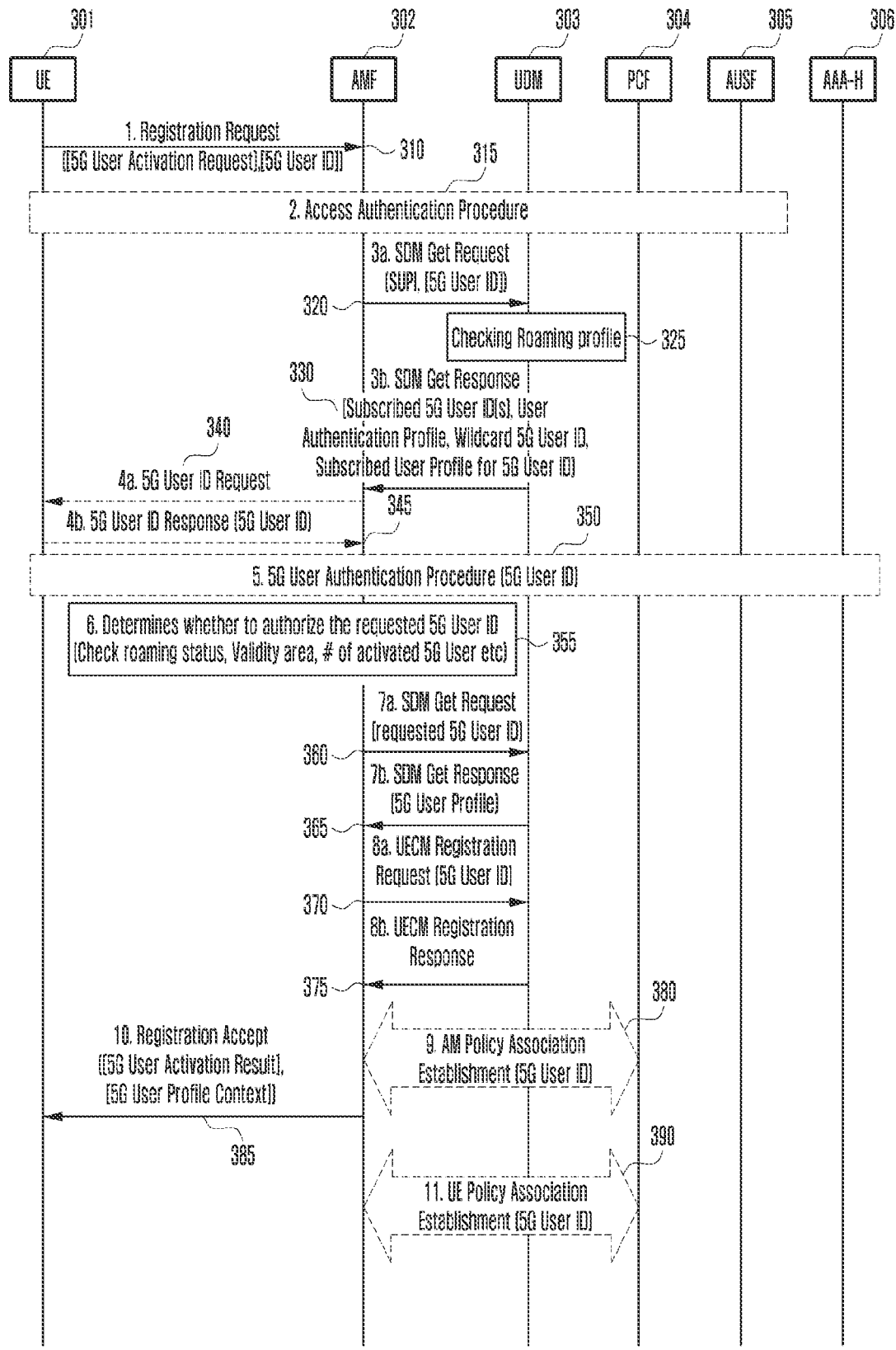
FIG. 3 is a diagram illustrating a procedure activating a 5G user by using a registration procedure in which a UE registers with a 5G system according to an embodiment of the disclosure.

FIG. 3 is a diagram illustrating a procedure for activating a 5G user by using a registration procedure in which a UE registers with a 5G system according to an embodiment of the disclosure.

In step 310, the UE 301 may transmit a registration request message including a 5G user activation request indicator and a 5G user identifier to be activated to the AMF 302. The registration request message transmitted by the UE 301 to the AMF 302 may be transmitted through a base station (RAN) (not illustrated).

In step 315, the AMF 302 may perform authentication of the subscriber UE, if necessary.

In step 320, the AMF 302 may transmit a request message to the UDM 303 to request subscription information for the subscriber UE. The request message may include an identifier (e.g., a subscription permanent identifier (SUPI)) of the subscriber UE 301. In addition, the request message may be an SDM get request message.

In addition, in step 330, the UDM 303 may transfer the subscription information of the subscriber UE 301 stored together with the identifier of the subscriber UE 301 to the AMF 302. In this case, the subscription information may be transmitted to the AMF 302 by being included in a response message, and the response message may be an SDM get response message. Subscription information may include the following.

Registered 5G user ID or list of registered 5G user identifiers 5G user authentication profile: whether authentication is performed, authentication method, available credentials, authentication server address Wildcard 5G user ID: This is an indicator indicating whether to allow activation of 5G user IDs that are not explicitly registered. Upon receiving a request for a 5G user ID not included in the explicitly subscribed 5G user identifier list, the AMF 302 receiving this indicator may determine whether to allow or not according to the authentication result from the external server.

Subscribed user profile by 5G user identifier: User profile information for 5G user identifier such as S-NSSAI, subscribed AMBR, and allowed area.

Upon receiving the request message from the AMF 302 in step 320, the UDM 303 may determine whether the UE 301 is roaming through the request message from the AMF 302 in step 325. The UDM 303 may determine whether to allow 5G user activation during roaming from the policy of the home operator network, the agreement with the visited operator, or the configuration information stored in the UDM 303. When the UE 301 is in a roaming state and 5G user activation in the serving network of the UDM 303 is not allowed, the UDM 303 may reject the request for 5G user activation. When the UDM 303 rejects the activation of the 5G user, the UDM 303 may transmit the response message in step 330 to the AMF 302 without including the subscribed 5G user ID. Alternatively, when the UDM 303 rejects the activation of the 5G user, the UDM 303 may include an indicator that 5G user activation is not supported in the roaming state in the response message of step 330 and deliver the response message to the AMF 302.

According to an embodiment, in step 310, the UE 301 may request activation of a 5G user and may not deliver a 5G user ID. When the AMF 302 receives the 5G user activation request in step 310 and does not receive the 5G user ID, the AMF 302 may request the 5G user ID from the subscriber UE 301 in step 340. The UE 301 may receive the 5G user ID request, and in response thereto, may transmit the 5G user ID to the AMF 302 in step 345.

In step 350, the AMF 302 may perform an additional 5G user authentication procedure when it is determined that authentication is required for 5G user activation by operator policy or local configuration, when it is specified that authentication is required in the 5G user authentication profile information received from the UDM 303, or when the 5G user identifier requested by the UE 301 is not included in the subscribed 5G user list, but wildcard 5G user identifier information is in the subscription information. An additional 5G user authentication procedure may be performed through an extensible authentication protocol (EAP) procedure, and 5G user ID may be included in all procedures. In addition, the authentication procedure of the 5G user may operate as described in FIG. 5 in more detail.

Figure 5:
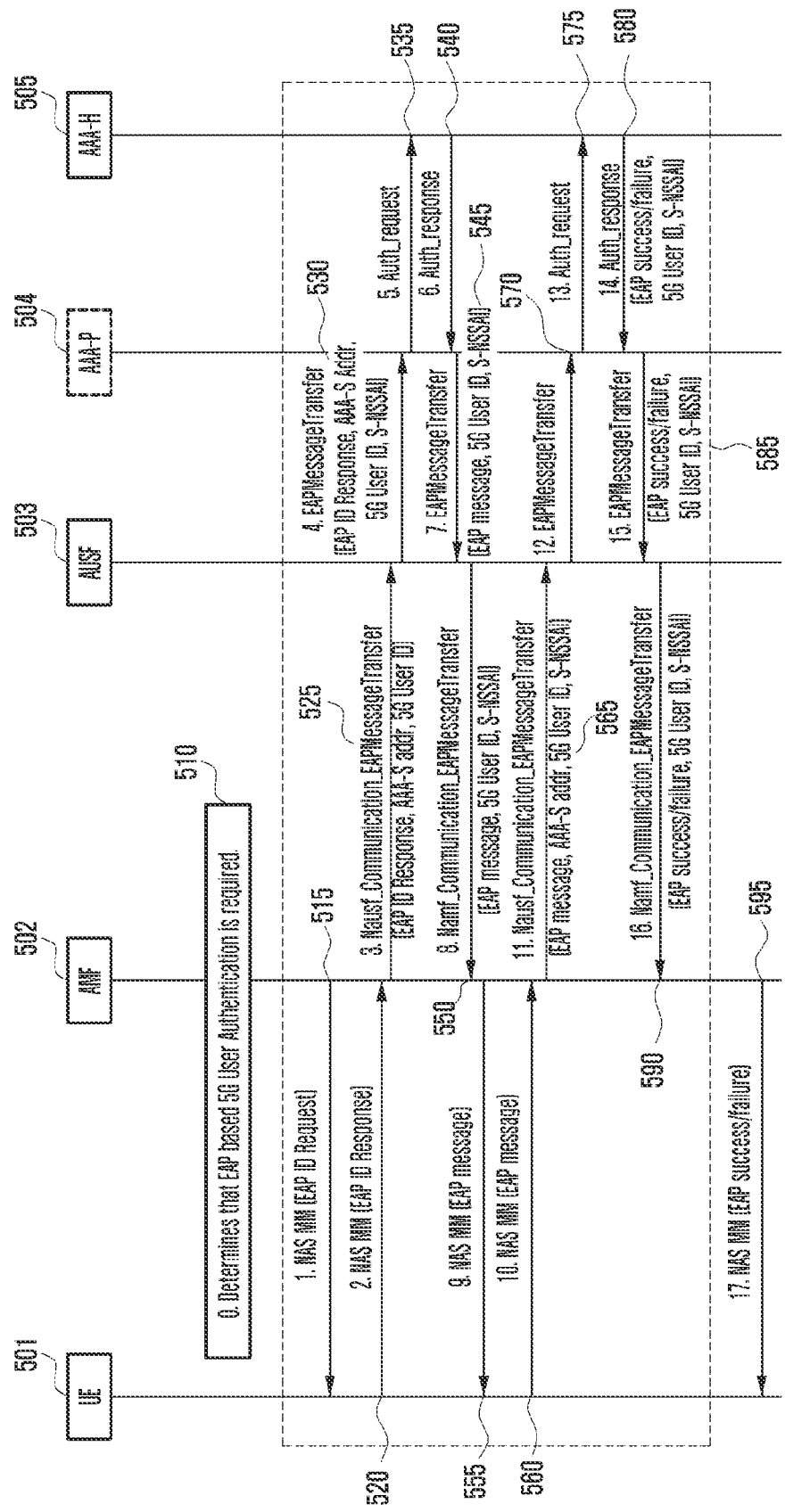
FIG. 5 is a diagram illustrating a procedure for authenticating a 5G user of a UE according to an embodiment of the disclosure.

FIG. 5 is a diagram illustrating a procedure for authenticating a 5G user of a UE according to an embodiment of the disclosure.

Referring to FIG. 5, the AMFs 302 and 502 may determine an authentication server (authentication, authorization, and accounting (AAA)) 306, 504, and 505 to perform 5G user authentication from a 5G user identifier, preconfigured information, or user authentication profile information received from the UDM 303. The AMFs 302 and 502 initiate an authentication procedure by delivering a message requesting authentication initiation to the authentication servers 306, 504 and 505. The authentication servers 306, 504, and 505 may perform an authentication procedure together with the UEs 301 and 501, the AMFs 302 and 502, and the AUSFs 305 and 503. When authentication is successfully completed, the authentication servers 306, 504, and 505 may transmit a message including the content that authentication is successful to the AMFs 302 and 502. When authentication fails, the authentication servers 306, 504, and 505 may transmit a message including an authentication result informing of the failure of authentication to the AMFs 302 and 502. In addition, the AMFs 302 and 502 may transmit a message including the authentication result to the UEs 301 and 501.

More specifically, in step 510, the AMF 502 may determine that an additional 5G user authentication procedure is required.

In step 515, the AMF 502 may transmit a NAS MM message including an EAP ID request to the UE 501. In step 520, the AMF 502 may receive a NAS MM message including an EAP ID response from the UE 501.

In step 525, the AMF 502 may transmit an EAP message transfer message including the EAP ID response received from the UE 501, the authentication server address, and the 5G user ID to the AUSF 503. In step 530, the AUSF 503 may transmit an EAP message transfer message to the authentication server (AAA-P) 504. The EAP message transfer message transmitted to the authentication server (AAA-P) 504 may include an EAP ID response, an authentication server address, 5G user ID, S-NSSAI, and the like.

In step 535, the AAA-P 504 may make an authentication request to the AAA-H 505, and in step 540, the AAA-H 505 may transmit an authentication response thereto to the AAA-P 504.

In step 545, the AAA-P 504 may transmit an EAP message transfer response to the AUSF 503 in response to the EAP message transfer message transmitted in step 530, and the response message may include an EAP message, 5G user ID, S-NSSAI, and the like. In step 550, the AUSF 503 may transmit an EAP message transfer response to the AMF 502, and the response message may include an EAP message, 5G user ID, S-NSSAI, and the like.

In step 555, the AMF 502 may transmit a NAS MM message including an EAP message to the UE 501. In step 560, the UE 501 may transmit the NAS MM message including the EAP message to the AMF (502).

In step 565, the AMF 502 may transmit an EAP message transfer message including the EAP message received from the UE 501 to the AUSF 503, an authentication server address, 5G user ID, and the like. In step 570, the AUSF 503 may transmit an EAP message transfer message to the authentication server (AAA-P) 504.

In step 575, the AAA-P 504 may make an authentication request to the AAA-H 505, and in step 580, the AAA-H 505 may transmit an authentication response to the AAA-P 504. The authentication response may include information on whether EAP was successfully performed or failed, 5G user ID, S-NSSAI, and the like.

In step 585, the AAA-P 504 may transmit an EAP message transfer response to the AUSF 503 in response to the EAP message transfer message transmitted in step 570, and the response message may include information on whether EAP was successfully performed or failed, 5G user ID, S-NSSAI, and the like. In step 590, the AUSF 503 may transmit an EAP message transfer response to the AMF 502, and the response message may include information on whether EAP was successfully performed or failed, 5G user ID, S-NSSAI, and the like.

In step 595, the AMF 502 may transmit a NAS MM message including information on EAP success or failure to the UE 501.

Referring back to FIG. 3, in step 355, the AMF 302 may finally determine whether to activate the requested 5G user by identifying a subscribed 5G user identifier or 5G user identifier list connected to the subscriber UE 301, a case when authentication is required, whether the authentication succeeded, roaming state, whether 5G users are located in permitted areas, whether the RAT accessed by the 5G user is allowed to access, and whether the maximum user ID allowed in the subscriber UE.

In step 360, if the AMF 302 determines to activate the 5G user of the subscriber UE 301, and does not receive a user profile for the 5G user identifier in advance, the AMF 302 may request a user profile for the 5G user identifier from the UDM 302. The UDM 303 may receive the 5G user identifier and transmit a 5G user profile corresponding to the 5G identifier to the AMF 302 in step 365. According to an embodiment, if the operator has a separate 5G user profile storage in addition to the UDM 303, the AMF 302 may request a 5G user profile from a designated 5G user profile server (not illustrated) instead of the UDM 303. A 5G user profile may include the following information.

A separate 5G user profile may include the following information, as exemplified in 5G User Profile Data (Separate DB) of FIG. 2.

5G user identifier (or user profile index)

Access and mobility management profile for each user: S-NSSAI, allowed area, RFID index, and allowed RAT information Session management profile for each user: DNN, AMBR (aggregated maximum bit rate) and subscribed QoS profile information Profile provider identifier: Identifier of the service provider associated with the profile, and may be a home network operator, a visited network operator, or a 3rd party service provider.

The 5G user profile information mentioned above may be stored in the UDR 303 and may be managed by the UDM 303 or a separate network function that manages the user profile.

In step 370, the AMF 302 may transmit a UECM registration request message to the UDM 303. If the AMF 302 permits the activation of the 5G user ID requested by the UE 301, the AMF 302 may include and transmit the 5G user ID in the UECM registration message to the UDM 303. In step 375, the UDM 303 may transmit a UECM registration response message to the registration request to the AMF 302. The UDM 303 stores whether or not 5G user ID is activated when the subscriber UE 301 is registered. Thereafter, in a procedure in which the other NF identifies whether the 5G user ID is activated to the UDM 303, information on whether the 5G user ID stored in the UDM 303 is activated may be provided to the other NF.

If the AMF 302 determines activation of the 5G user ID of the subscriber UE 301 in step 380, the AMF 302 may request an access and mobility (AM) policy for the 5G user ID from the PCF 304 according to the local policy. In addition, the AMF 302 may receive the AM policy for the 5G user ID from the PCF 304. According to the local policy, the AMF 302 may perform an AM policy association procedure with the (V-)PCF 304.

If the AMF 302 has not previously obtained an access and mobility (AM) policy for the 5G user ID, and it is determined that a separate AM profile application for the 5G user ID is necessary, or the AM policy for the subscriber in the AMF 302 is no longer valid, the AMF 302 may receive the operator policy for the UE 301 from the PCF 304 and apply the same. The AMF 302 may request a connection for AM policy control from the (V-)PCF 304. The request message may include a subscriber UE identifier (e.g., SUPI), a 5G user identifier, an internal group identifier, a subscription notification indicator, service area restrictions, an RFSP index, a subscribed UE AMBR, an allowed NSSAI, a GPSI received from the UDM 303, and access type, RAT, PEI, UE location information, UE time zone, serving network information, etc.

The (V-)PCF 304 may deliver an AM policy (e.g., service area restriction information) to the AMF 302 in response. In addition, the (V-)PCF 304 may transmit a policy control request trigger for the AM policy to the AMF 302. The AMF 302 is subscribed to a notification service that implicitly requests to notify the changed information when the policy is changed in PCF 304, and when the policy is changed in (V-)PCF 304, the AMF may receive a notification from (V-)PCF 304.

The AMF 302 may apply an AM policy. Applying the AM policy includes the following operations.

Store service area restriction and PCRT (policy control report trigger),

Provide service area restriction information to the UE 301.

Provide RFSP index, UE-AMBR, and service area restriction information to the RAN.

In step 385, the ANF 302 may transmit the result of whether to permit 5G user activation in step 355 in 5G user activation result information to the UE 301. The registration permission message includes service area restriction information for the subscriber UE 301 and service area restriction information of the 5G user, and may be delivered to the UE 301.

In step 390, the AMF 302 may establish a connection with the PCF 304 for transmitting the UE policy. The AMF 302 may deliver the 5G user ID to the PCF 304 in order for the PCF 304 to further include the UE policy for the 5G user ID in the UE policy including the URSP (UE route selection policy) and the ANSP delivered to the UE 301, and deliver the UE policy. In addition to the 5G user ID, the AMF 302 may transmit an indicator requesting delivery of the UE policy for the 5G user ID to the PCF 304.

The PCF 304 receives an indicator requesting delivery of a 5G user ID or a UE policy for 5G user ID in the UE policy-related connection request message received from the AMF 302, and may identify the UE policy for the 5G user ID. The PCF 304 identifies both the UE policy for the 5G user ID and the UE policy for the subscriber UE (SUPI), identifies whether there is a conflict for the two policies, and may generate a UE policy to which both types of policies may be reflected. In addition, the PCF 304 delivers the newly generated UE policy to the UE 301.

Meanwhile, according to an embodiment, when the registration of the 5G user (or UE) 301 permitted for registration is released, the UDM 303 may delete 5G user profile information.

Second Embodiment

In this embodiment, a procedure for a method for the UE to request generation of verification information for the 5G user ID and to generate the verification information for the requested 5G user ID in the 5G core network is described.

Figure 4:
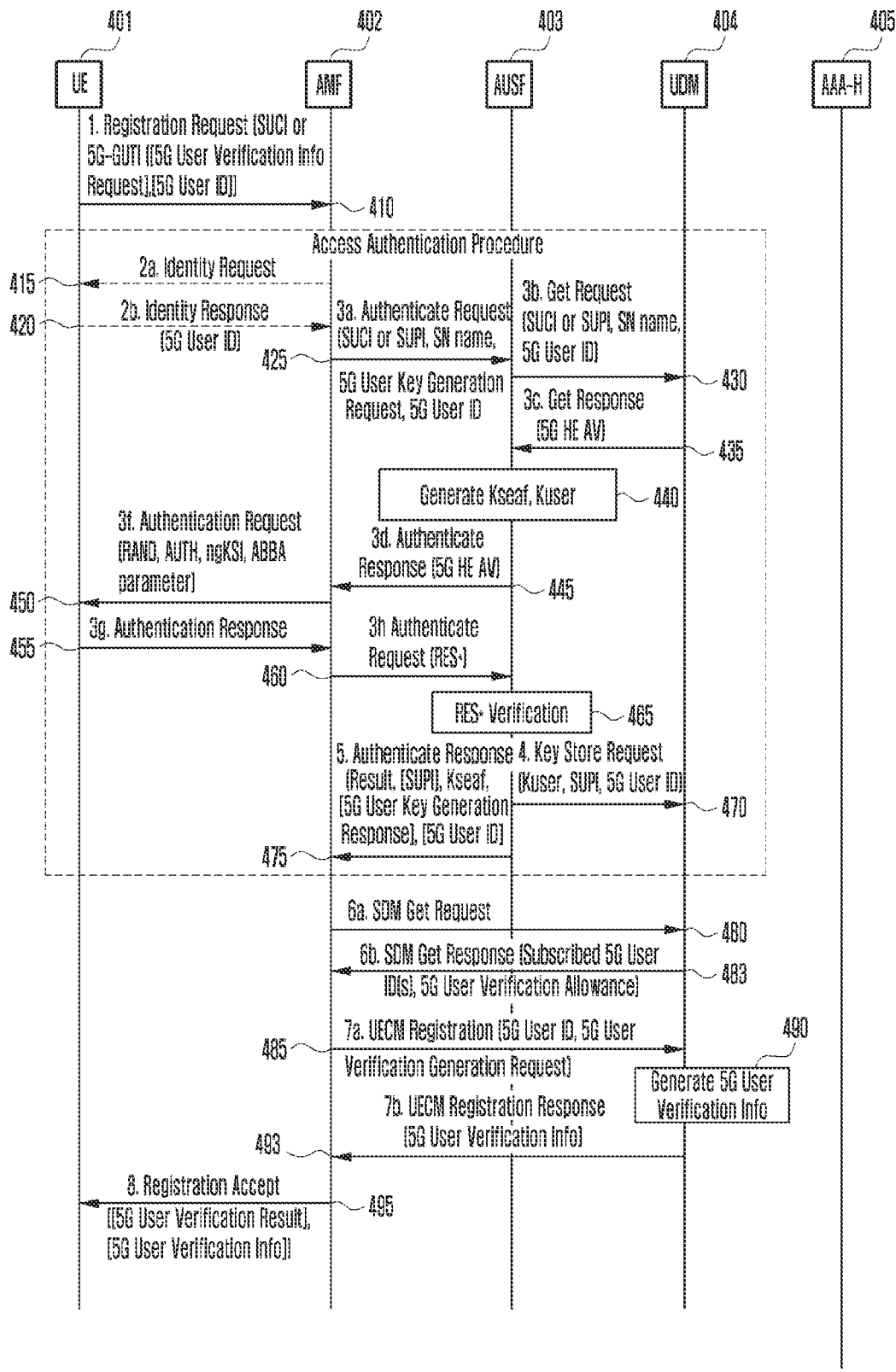
FIG. 4 is a diagram illustrating a procedure in which a UE requests 5G user verification and user verification information from a 5G system according to an embodiment of the disclosure.

FIG. 4 is a diagram illustrating a procedure in which a UE requests 5G user verification and user verification information from a 5G system according to an embodiment of the disclosure.

When a user's request using the subscriber UE 401, an application running on the subscriber UE 401, or the subscriber UE 401 operates as a gateway UE, the subscriber UE 401 receives a request from a device connected to the backside of the gateway UE or an application running on the device, and initiates a 5G user verification information generation request procedure.

Referring to FIG. 4, in step 410, the subscriber UE 401 may transmit a request message including an indicator for requesting generation of user verification information in the registration request message, a user identifier, and a subscriber identifier (e.g., SUCI, 5G-GUTI, SUPI, etc.) to the AMF 402. According to an embodiment, the 5G user identifier may be omitted from the request message.

In step 410, if the subscriber UE 401 does not transmit the 5G user identifier to the AMF 402, in step 415, the AMF 402 may transmit a message requesting the 5G identifier to the subscriber UE 401 in order to obtain the 5G user identifier. The subscriber UE 401 may receive the user identifier request message and transmit a user identifier for the 5G user confirmation request to the AMF 402 in step 520. The AMF 402 may obtain a 5G user identifier from the subscriber UE 401.

The AMF 402 may receive a user verification information generation request, a subscriber identifier (e.g., SUCI, 5G-GUTI, SUPI, etc.), and a user identifier from the subscriber UE 401, and may initiate an authentication procedure for the subscriber. In step 425, the AMF (SEAF) 402 may transmit an authentication request message to the AUSF 403. The authentication request message may include an identifier (SUCI or SUPI) of the subscriber UE 401, a serving network name, a 5G user identifier, and a 5G user key generation request indicator, and the authentication request message may be transmitted to the AUSF 403.

The AUSF 402 may receive an authentication request message from the AMF (SEAF) 402, and may request authentication information for the subscriber UE 401 from the UDM 404 in step 430. In step 435, the AUSF 403 may receive a 5G authentication vector (5G HE AV: home environment authentication vector) from the UDM 404.

The AUSF 403 may receive an authentication request message for the subscriber UE 401, a 5G user key generation request, and a 5G user identifier from the AMF 402, and may receive the 5G authentication vector for the subscriber UE 401 from the UDM 404. In addition, using this, in step 440, the AUSF 403 may generate a key ($K_{5guser}$) for the 5G user identifier.

In step 445, the AUSF 403 may transmit the 5G authentication vector to the AMF (SEAF) 402.

In step 450, the AMF 402 may transmit RAND, AUTH, ngKGI, and ABBA parameters to the UE 401.

The UE 401 may transmit a response to the authentication request to the AMF 402 in step 455. In this case, the response message may include RES*.

The AMF 402 may transmit the RES* to the AUSF 403 including the RES* in the authentication request message in step 460.

The AUSF 403 calculates the value of RES*, verifies whether the response received from the UE 401 is appropriate, and may determine whether authentication of the subscriber UE 401 is successful.

If the AUSF 403 determines that the authentication of the UE 401 is successful, and receives a 5G user identifier and a key generation request in the previous step 425, in step 470, the AUSF 403 may request the UDM 404 to store a key for the newly generated 5G user by transmitting a request message including the generated user key ($K_{5user}$), user identifier, and subscriber UE identifier to the UDM 404.

In step 475, the AUSF 403 may transmit the authentication response message to the AMF 402 including an authentication result indicating whether or not authentication has been performed successfully, a key (Kseaf) to be used in AMF (SEAF) 402, subscriber identifier, and a 5G user key generation result and 5G user identifier indicating whether the 5G user key was successfully generated in the authentication response message.

In step 480, the AMF 402 may transmit a request for subscriber information for the subscriber UE 401 to the UDM 404. In addition, in step 483, the AMF 402 receives permission information on whether to allow generation of 5G user verification information for each 5G user identifier and a list of 5G user identifiers subscribed to the subscriber UE from the UDM 404, or to expose the generated user verification information to the outside.

The AMF 402 may determine whether to generate verification information for the 5G user by verifying the information received from the UDM 404. More specifically, the AMF 402 may determine whether to generate 5G user verification information by identifying whether the 5G user requested by the subscriber UE 401 is a subscribed user received from the UDM 404, subscription information on whether separate key generation for 5G users is allowed, and self-configuration information of the operator. When the AMF 402 determines to generate 5G user verification information, the AMF 402 may transmit a 5G user verification information generation request to the UDM 404 in step 485.

In step 485, the UDM (404) that receives the 5G user verification information generation request from the AMF (402) may identify user profile information of a UDR (not illustrated) that stores a user profile managed by the UDM 404 in step 490 and generate 5G user verification information. The 5G user verification information may include information such as 5G user identifier, application identifier using 5G user identifier, 5G application service provider information and application authority information required by 5G users, access information for application connected to subscriber UE to access service provider's server, etc. (e.g. URL, etc.). The UDM 404 may generate 5G user verification information, and transmit the generated 5G user verification information to the AMF 402 in step 493.

In step 493, the AMF 402 may receive 5G user verification information in response to the 5G user generation request from the UDM 404. In step 495, the AMF 402, which has successfully received the 5G user verification information to the UDM 404, transmits the 5G user verification result and 5G user verification information indicating whether the 5G user confirmation is successful to the UE 401.

According to the embodiment, in step 493, The AMF 402 may notify the UE 402 including information indicating that the 5G user verification result has failed in the case that authentication to the subscriber UE 401 has failed in step 475, AUSF has failed to authenticate the user, AUSF failed to generate user key, or as a result of the AMF 402 identifying the subscription information of the UDM 404, if the 5G user requested by the subscription UE 401 is not subscribed, or if the subscription UE 401 fails to verify additional 5G users, etc.

The subscriber UE 401 may receive a 5G user confirmation result and 5G user verification information.

According to an embodiment, when the registration of the 5G user (or UE) 401 permitted for registration is released, the UDM 404 may delete 5G user verification information.

Third Embodiment

In this embodiment, a method of provisioning a user profile from outside the 3GPP system network or from an application function (AF) agreed with a 3GPP operator will be described.

Figure 6A:
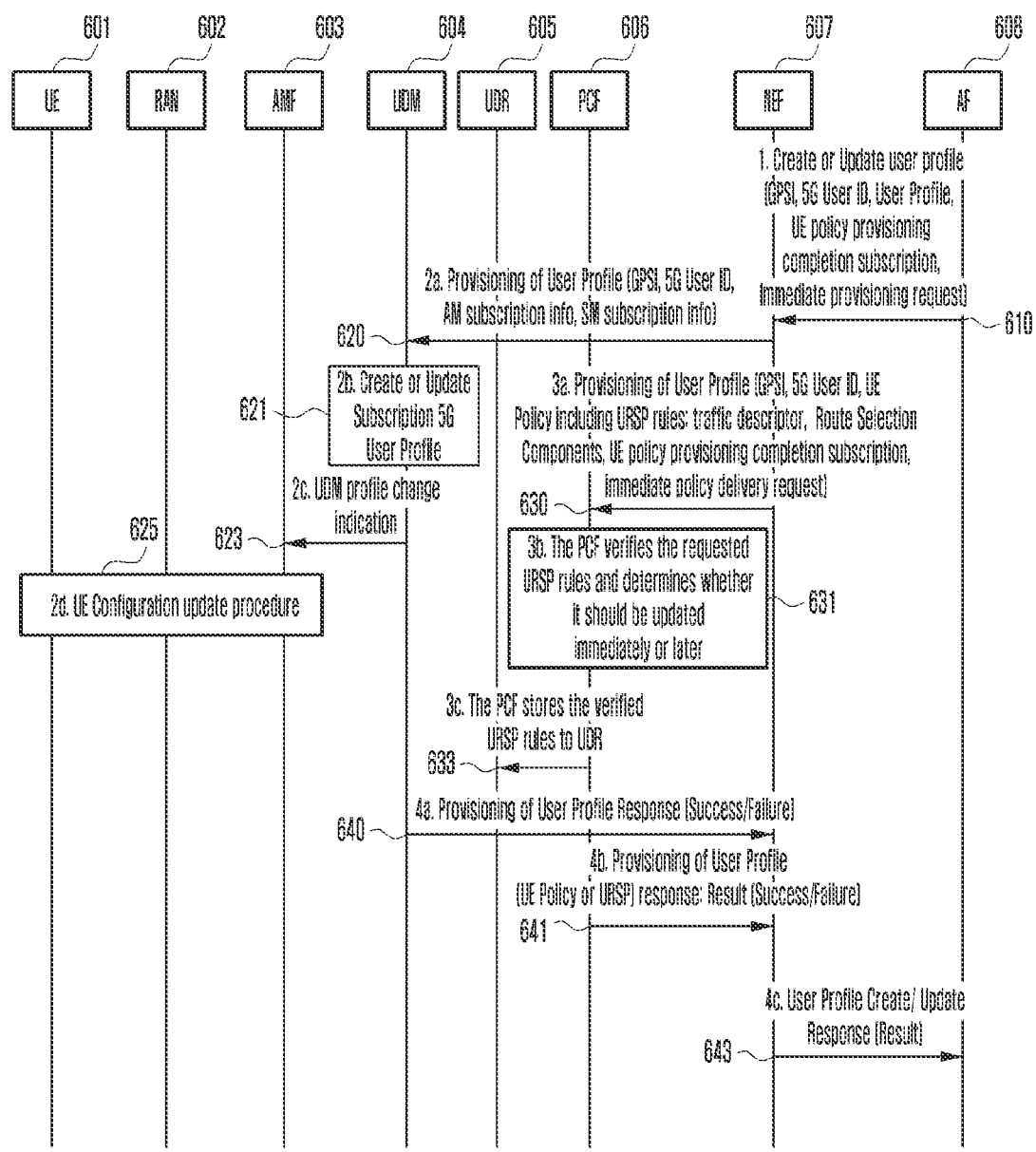
FIGS. 6A and 6B are a user profile update procedure disclosed by an AF according to an embodiment of the disclosure.
Figure 6B:
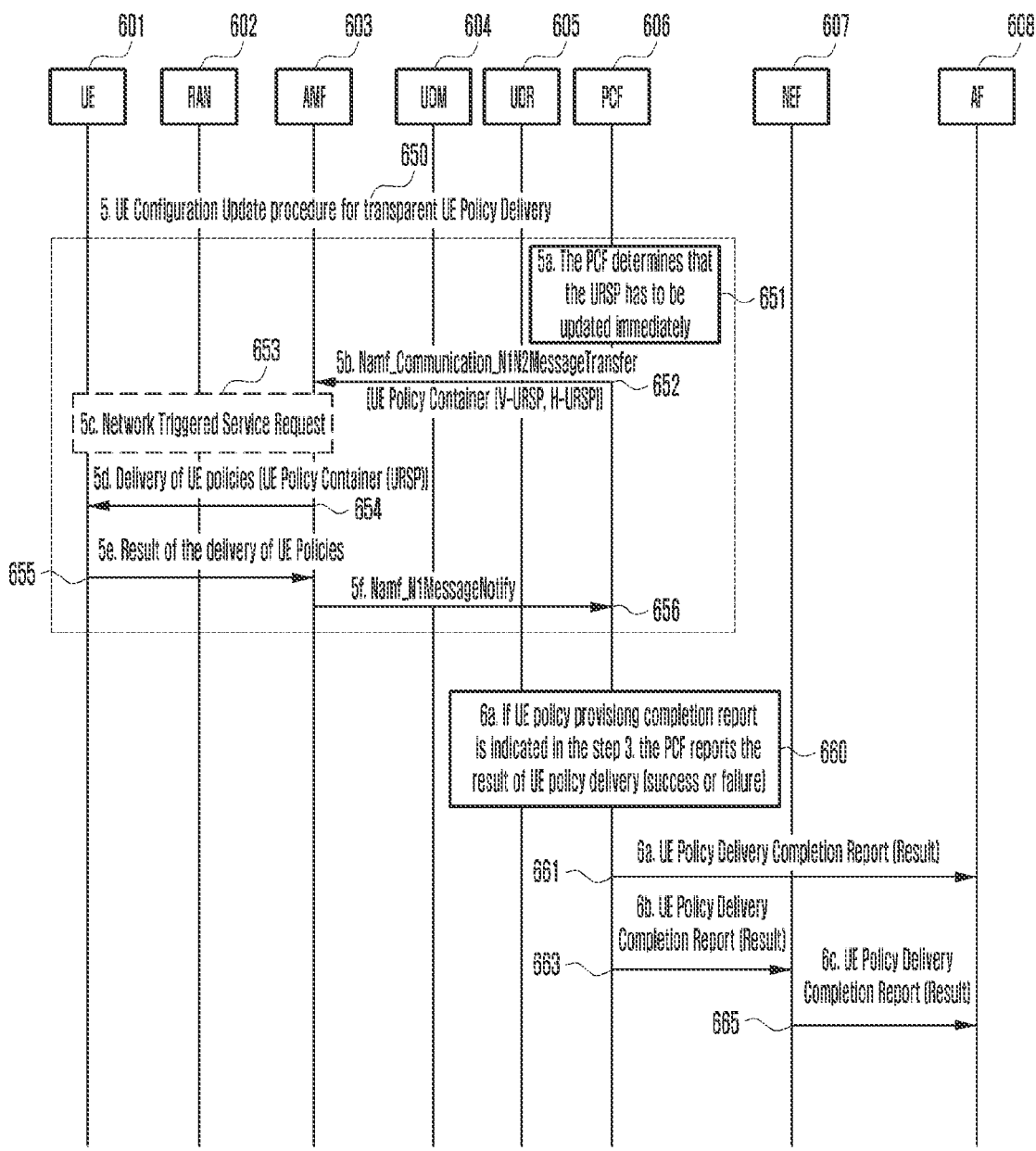

FIGS. 6A and 6B are a user profile update procedure disclosed by AF according to an embodiment of the disclosure.

In the structure illustrated in FIG. 2, the user profile may be managed by the UDM or a separate independent NF managing the user profile, and the user profile information may be stored in the UDR.

As illustrated in FIGS. 6A and 6B, the AF 608 may generate or change the user profile information disclosed in the disclosure. In addition, the AF 608 may associate the 5G user ID with the subscriber UE identified by GPSI. Alternatively, in step 610, the AF 608 may transmit the 5G user ID described in the disclosure to the NEF 607 in the GPSI format to generate or change the profiles of the subscriber UE connected to the GPSI.

The NEF 607 which has been requested to generate, change or delete a user profile from AF 608, in step 620, may provide a user profile to the UDM 604 and request a user profile, that is AM subscription information, or generate, change, or delete SM subscription information from the UDM 604 using the subscriber management service provided by the UDM 601. In step 620, the NEF 607 may transmit a message including GPSI, 5G user ID, AM subscription information, SM subscription information, and the like to the UDM 604. The UDM 604, which has been requested to generate/change/delete the user profile in step 620, may find the corresponding subscriber information from the corresponding GPSI in step 621, and identify the authority to change the subscriber information externally. If it is possible to modify the subscriber information from the outside, the UDM 604 may perform a request to generate, change, or delete the requested user profile.

In step 610 of FIGS. 6A and 6B, the NEF 607 that has received a request for generation, modification, or deletion of the user profile from the AF 608 may determine whether the corresponding information is a type of profile in which the UE policy needs to be changed. If the information to which the NEF 607 has received a request for modification relates to a UE policy such as a URSP, the NEF 607 may find SUPI information from the GPSI. The NEF 607 may generate, modify, or delete a URSP policy for the subscriber UE 601 identified by GPSI or SUPI in the UDR. The URSP policy may include information such as traffic descriptor (OSId, OSAppID, IP Filter 3-tuple, FQDN, and Route Selection Component). The traffic descriptor may be information such as an operating system identifier (OSID) of the UE, an app identifier (OSAppID), IP destination address and port (IP-3tuple; i.e., IP address, Layer 4 port number and protocol ID), a destination fully qualified domain name (FQDN), and a DNN (or APN). In addition, the route selection component may have values such as DNN (or APN), S-NSSAI, PDU session type (i.e., iPv4, IPv6 or IPv4v6, Ethernet-Type or unstructured data), and SSC mode. The UE policy may include an ANDSP policy.

In addition, the UDM 604 transmits a UDM profile change instruction to the AMF 603 in step 623, and accordingly, the AMF 603 may perform a UE configuration update procedure with the UE 601 in step 625 (through RAN 602).

In addition, the UDM 604 may transmit a message including information on whether the UDM profile change has been successfully performed to the NEF 607 in step 640.

According to an embodiment, in step 610, the NEF 607 may receive, from the AF 604, a request to report that provisioning of the UE policy has been completed or a message including information requesting to apply the provisioning of the UE policy. Upon receiving this request, the NEF 607 may transmit a corresponding request to the PCF 606 in step 630.

In step 630, the NEF 607 may provide a user profile to the PCF 606 and request the PCF 606 to generate, change, or delete a user policy provided by the PCF 606. Together with this request, the NEF 607 may transmit a message including a UE policy delivery completion report request and an immediate UE policy delivery request to the PCF 606. The PCF 606, which has been requested to generate, change, or delete a user policy in step 630, may search for corresponding subscriber information from the corresponding GPSI in step 631, and generate, change, or delete a policy for the corresponding user. In step 630, the NEF 607 may transmit user policy information including a GPSI, a 5G user ID, and a URSP policy to the PCF 606. The USRP policy information may include a traffic descriptor, route selection components, etc.

The PCF 606, which has received the URSP policy for the UE 601 from the NEF 607, may obtain the existing URSP rule for the UE 601 identified by the subscriber identifier (e.g., GPSI or SUPI, etc.) that has received the existing URSP policy of the corresponding UE 601 from the UDR 605 in step 633, and examine the requested URSP rule. This inspection may be to determine whether or not conflicts with rules to be installed or installed in the UE or whether a requested rule conforms to the operator's prior policy. In this process, the PCF 606 may determine a priority for the requested URSP rule. The PCF 606 may change the requested URSP rule or the existing URSP rule or generate a new URSP rule based on the requested URSP rule or the existing rule, and may rearrange the newly configured URSP rules into priorities according to operator policy and UE subscription information to determine or re-determine priorities included in individual URSP rules. The URSP rules rearranged in this way may be reallocated in the policy section in consideration of the preconfigured NAS maximum transmission size. The reassigned policy section may be included in the UE policy container together with the operator's identifier and delivered to the UE 601.

In addition, the PCF 606 may determine whether or not the requested UE policy (URSP or ANDSP) should be immediately delivered to the UE 601 in consideration of whether an immediate request indicator included in the provisioning request is included and the operator's policy. In the case of the URSP rule as requested or adding priority to the requested URSP rule, or in the case of a conflict with an existing policy or inconsistency with the operator's policy and subscriber information, the PCF 606 may resolve the inconsistency by changing the existing UE policy or the newly installed UE policy, and may store the changed UE policy in the UDR 605 (step 633).

The PCF 606 may transmit a response message to the NF (the NEF 607 in this example) that has requested the policy change of the UE 601 in step 641. If the policy for the requested UE 601 does not match the existing policy, the operator's policy or subscription information, the PCF 606 may deliver a result message including a failure or rejection for provisioning of a UE policy to the requesting NF (NEF 607 in this example). Although it is exemplified that the NF requesting the PCF 606 is the NEF 607 in this embodiment, it is also possible that the AF 608 directly requests the PCF 606. When the AF 608 requests a completion report on whether the UE 601 of the UE policy has been successfully provisioned through the NEF 607, the PCF 606 may determine whether to report the UE policy completion. In addition, when the PCF 606 determines to perform the UE policy completion report, the PCF 606 may store the UE policy completion report in the PCF 606 or in the UDR 605. The PCF 606 may also respond to the NEF 607 with an indicator indicating that it has successfully subscribed to the completion reporting service.

In step 643, the NEF 607 may deliver the provisioning result received from the PCF 606 to the AF 608.

When the PCF 606 determines that the UE policy including the URSP and ANDSP is to be immediately performed in step 651, the PCF 606 may perform step 652 to immediately perform the UE policy delivery procedure. The PCF 606 may determine to deliver the UE policy while the UE 601 is in a CM-CONNECTED state. In this case, the PCF 606 may subscribe the AMF 603 to the reporting service for the CM status change of the UE 601 in advance. In addition, if not subscribed to the reporting service in advance, the PCF 606 may request the AMF 603 to subscribe to the reporting service for CM status change. If the AMF 603 is subscribed to the reporting service for the CM status change, the PCF 606 may know the CM status of the UE 601.

If the PCF 606 is configured to deliver the UE policy only when the UE 601 is in the CM-CONNECTED state, the PCF 606 may know the CM state, and the CM state is the CM-CONNECTED state, the PCF 606 may perform a UE policy delivery procedure.

When the PCF 606 determines to update the UE policy, the PCF 606 may transmit a message such as Namf_Communication_NIN2Message to the AMF 603 (step 652). In this case, the message delivered to the AMF 603 may include a UE policy.

According to an embodiment, a service request triggered in the network may be initiated between the UE 601 and the AMF 603 in step 653.

In step 654, the AMF 603 may transparently transmit the UE policy container to the UE 601 through registered and reachable access.

When the UE 601 is in a CM-CONNECTED state through 3GPP access or non-3GPP access, the AMF 603 may transparently transmit the UE policy received from the PCF 606 to the UE 601. In an embodiment, the UE policy may include ANDSP and URSP.

The UE 601 may update the UE policy provided from the PCF 606. In addition, in step 655, the UE 601 may transmit the update result to the AMF 603. That is, the UE 601 may transmit information on the updated policy to the AMF 603.

When the AMF 603 receives the UE policy, and the PCF 606 is subscribed to be notified of the reception of the UE policy, in step 656, the AMF 603 may transmit the response of the UE 601 to the PCF 606 using the Namf_NIMessageNotify message.

In step 660, the PCF 606 may maintain the latest PSI list delivered from the UE 601 and update the latest PSI list of the UDR 605 by calling the Nudr_DM_Update (including SUPI, policy data, policy set items, updated PSI data, etc.) service operation.

If it is determined that the PCF 606 is subscribed to the UE policy delivery completion report, in step 661, the PCF 606 may notify the subscribed NF (e.g., the AF 608) whether or not the UE policy delivery has been successfully delivered.

When the AF 608 subscribes to the UE policy delivery report through the NEF 607, this report may be delivered to the AF 608 through the NEF 607 (steps 663 and 665).

Alternatively, the PCF 606 may directly transmit the UE policy completion report based on the notification address (notification endpoint address) delivered by the AF 608 at the time of subscription.

Fourth Embodiment

In this embodiment, a 5G user confirmation procedure will be described. This embodiment describes how the AF operated by the operator or the AF of a 3d party that has entered into an agreement with the operator identifies 5G user information by using the information generated in the user verification information generation procedure described in the second embodiment in the application layer of the UE.

FIG. 7 is a 5G user identification procedure according to an embodiment of the disclosure.

Referring to FIG. 7, in step 710, the application 702 of the UE in the subscriber UE 701 may request 5G user verification information from the mobile terminal (MT) (or communication processor) 703 in the UE 701. The application 702 in the UE 701 may be an edge enabler client in the edge computing application hierarchy. When the subscriber UE (UE) 701 supports the AT command by separating the MT and the TE from each other, the TE may request 5G user verification information through the AT command provided by the MT. Independently from that illustrated in FIG. 1, as a subject that requests 5G user identification, the user may request through the user interface as described in the content illustrated in FIG. 2, or it is possible to deliver such a request from a device connected to the back of the gateway UE or an application installed on the device. This request message may include a 5G user identifier, a 5G activation request indicator, and a 5G user verification information generation request indicator.

In step 720, when a 5G user identification request is received from an application in the UE to be identified by the 5G user, the user or the device connected to the gateway UE, or an application loaded on the device, the communication module (MT 703 or communication processor in FIG. 7) of the subscriber UE 701 may perform the 5G user verification information generation request procedure described in the second embodiment. If this procedure is successfully performed, 5G user verification information may be generated in the UDM 707. The communication module (MT 703 in FIG. 7 or communication processor) of the subscriber UE 701 may receive a response indicating that the 5G user verification information has been successfully generated. The step 720 of FIG. 7 may be performed together with the 5G user activation procedure in the first embodiment.

The communication module 703 of the subscriber UE 701 that has successfully performed the 5G user identification procedure through the step 720 may transmit user verification information to the application 702 in step 730. The user verification information may include a 5G user identification result, 5G user verification information, a result of a 5G user activation request, etc.

In step 710, when the device connected to the application 702, the edge enabler client, or the gateway UE receives the 5G user identification result, the application 702 may deliver the application layer message including the 5G user identifier and 5G user verification information to the AF 709. In this case, the application 702 may transmit the application layer message by application logic.

Upon receiving the application layer message, in steps 750 and 753, the AF 709 may transmit a 5G user identification request to the UDM 707 through the NEF 708 to identify whether the user is a registered user provided by a mobile communication service provider. The request message may include 5G user identifier, GPSI, and 5G user verification information. In addition, according to an embodiment, the AF 709 agreed within the mobile communication service provider in step 755 may directly transmit a 5G user identification request to the UDM 707 without going through the NEF 708.

The UDM 707 may compare the 5G user verification information for the 5G user identifier generated in the second embodiment with the 5G user verification information received in steps 750 to 755, and determine whether the 5G user is permitted by the mobile communication operator. If it is determined that the 5G use request is appropriate, in steps 760, 763, and 765, the UDM 707 may transmit a response permitting 5G user identification to the AF 709. The UDM 707 may transmit the response to AF 709 via NEF 708 (steps 760 and 763), or the UDM 707 may transmit the response directly to the AF 709 according to an embodiment (step 765).

In step 770, the AF 709 receives the result for the 5G user identification request, and if the identification request is successfully verified, AF 709 may permit the application layer request transmitted by the 5G user's application 702, and transmit an appropriate response to the application layer request to the 5G user's application 702.

Figure 8:
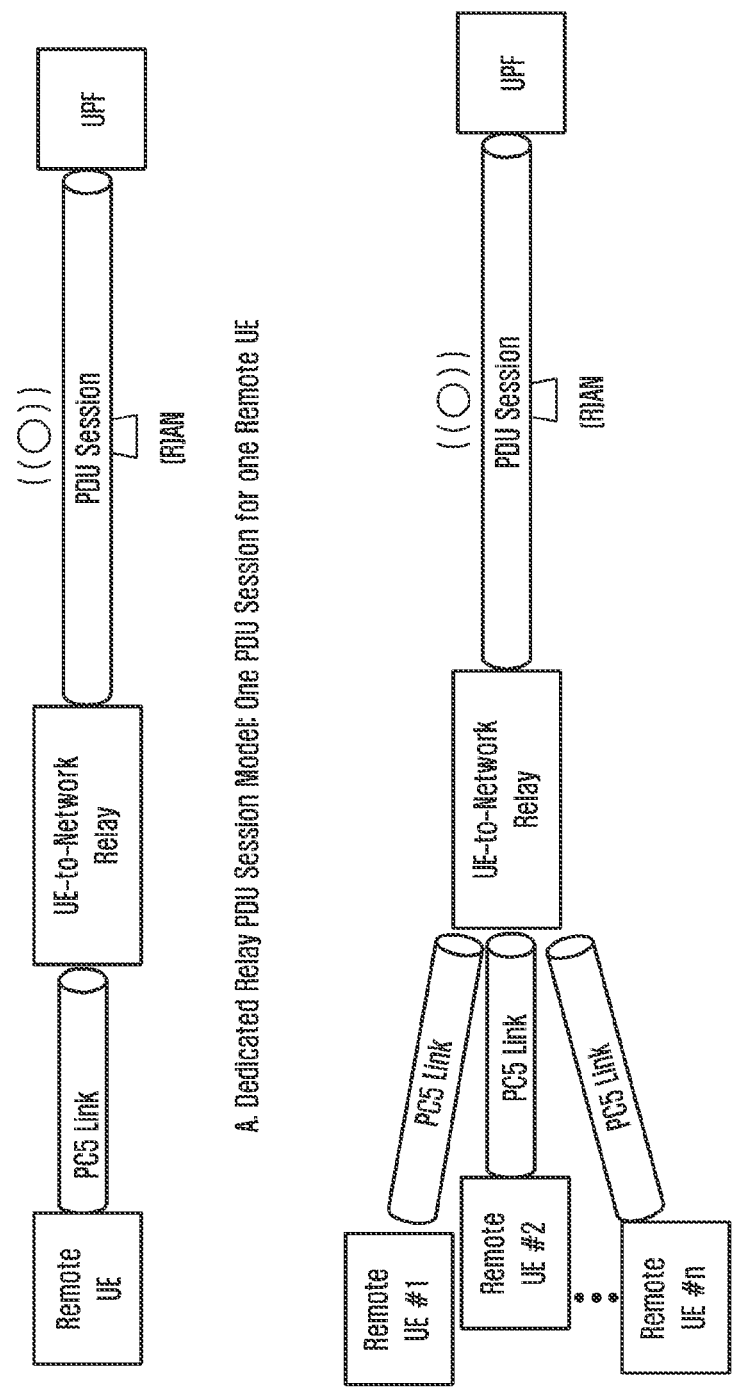
FIG. 8 is a description of a 5G ProSe UE-to-network relay session model.

The following two embodiments are based on the assumption of the 5G proximity-based services (ProSe) UE-to-network relay session model illustrated in FIG. 8. The diagram described in FIG. 8 is a diagram illustrating a UE-to-network relay network service that provides a connection to a data network connected to a protocol data unit (PDU) session provided by a 5G core network by a remote UE through a PC5 link through a UE-to-network relay UE. In FIG. 8, the remote UE may be connected to the UE-to-network relay through the relay UE and PC5 (ProSe Communication 5) connection, and the UE-to-network relay UE provides the remote UE with a connection to the data network through a PDU session.

The first model of FIG. 8 is a model in which one remote UE exclusively uses one PDU session generated by the UE-to-network relay. The UE-to-network relay provides a connection to the data network to the remote UE through one PDU session connected with the 5GC network for one remote UE. This model is called a dedicated UE-to-network relay session model (dedicated relay session model). This scenario is a scenario in which a dedicated remote UE uses the PDU session provided by the UE-to-network relay, and when the network operator operates a separate PDU session for each remote UE and provides separate billing and policies, this scenario may be usefully used when providing a connection to a separate slice or data network for each remote UE.

The second model of FIG. 8 is a model in which a plurality of remote UEs share one PDU session generated by the UE-to-network relay. The UE-to-network relay provides a connection to a data network through UPF to a remote UE through a plurality of PC5 links connected to a plurality of remote UEs for one PDU session generated together with the 5GC network. This model is called a shared UE-to-network relay session model (shared relay session model). This scenario is useful in a scenario where a UE-to-network relay provides Internet connectivity to multiple remote UEs.

In the diagram of FIG. 8, the remote UE corresponds to a separate device connected to the gateway UE (gateway terminal) in FIG. 2, and the UE-to-network relay UE in the diagram of FIG. 8 corresponds to the gateway UE in FIG. 2. Therefore, the 5G user ID described in FIG. 8 is information corresponding to the remote UE ID.

In addition, in the disclosure, a network control method is described in order for a network operator to provide a function allowing a remote UE to use a PDU session of a UE-to-network relay. In the disclosure, the 5GC authenticates the remote UE through information (e.g., remote UE identifier information) on the remote UE provided by the UE-to-network relay and provides permission to use the remote UE. This procedure may be supported by the NF (e.g., SMF) in the 5G core network by identifying the subscriber information stored in UDM, PCF, or DN-AAA (data network authentication authorization accounting) for the remote UE.

Fifth Embodiment

In the fifth embodiment, a method for remote UE authentication and use permission controlled by the network in a dedicated relay session model will be described. It will be described with reference to FIG. 9.

Figure 9:
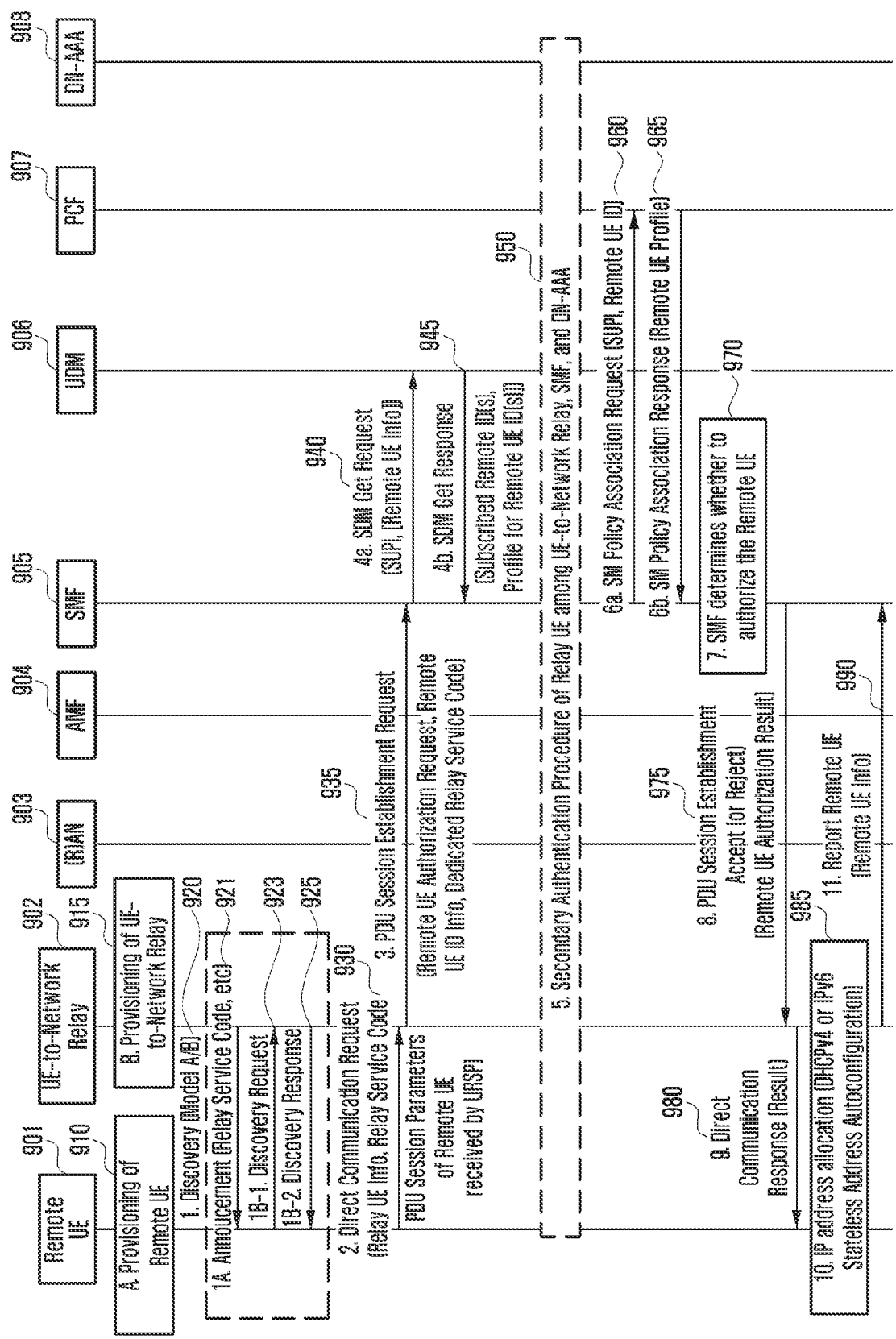
FIG. 9 illustrates an example of a remote UE authentication and a use permission method controlled by a network in a dedicated relay session model according to an embodiment of the disclosure.

FIG. 9 illustrates an example of a remote UE authentication and use permission method controlled by a network in a dedicated relay session model according to an embodiment of the disclosure.

Referring to FIG. 9, steps 910 and 915 are preconfigured procedures for the remote UE 901 and the UE-to-network relay 902.

A. A pre-configuration procedure for the remote UE 901 (step 910). In the remote UE 901, information that may be used to connect to the UE-to-network relay 902 may be preconfigured. This information may be provisioned in advance to the remote UE 901 through the 5GC network, or may be configured in advance in the remote UE 901. This information may include a dedicated relay session service code for finding a dedicated relay session. In addition, an appropriate UE route selection policy (URSP) may be configured in the remote UE 901. For example, a ProSe UE-to-network Offloading indicator using a dedicated relay session model may be configured as a route selection component.

B. A pre-configuration procedure for the UE-to-network relay 902 (step 915). In the UE-to-network relay 902, information that may be used to manage the PC5 Link may be preconfigured. This information may be provisioned in advance to the UE-to-network relay 902 through the 5GC network, or may be configured in advance to the UE-to-network relay 902. This information is the same information as dedicated relay session service code or shared relay session service code, and the UE-to-network relay 902 may use pre-configured information for a procedure of announcing a service provided by the UE-to-network in a discovery procedure. The UE-to-network relay 902 may be configured with a network control authentication/use permission indicator. If this indicator is configured, the UE-to-network relay 902 may perform a procedure in which the network described in the procedure below of the disclosure controls the permission of the remote UE 901 for the PDU session of the UE-to-network relay 902 to-network relay 902.

The step 920 is a service discovery procedure for the relay service provided by the remote UE 901 from the UE-to-network. There may be two methods for the remote UE 901 to discover the service provided by the UE-to-network.

First, the UE-to-network relay 902 may periodically deliver the contents of the service provided by itself, i.e., a relay service code, to the nearby remote UE 901 through an announce message (step 921). The relay service code may include a dedicated relay session service code in the case of a dedicated relay session model and a shared relay session service code in the case of a shared relay session model, respectively. The announce message may further include a Layer 2 identifier of the UE-to-network relay 902 or an application layer identifier that provides a relay service along with the service code. The relay service code may use a separate code to indicate the relay session model. Alternatively, additional information specifying whether the relay session model, that is, a dedicated relay session service model or a share relay session model, may be transmitted to the remote UE 901 through a separate indicator.

The second method for the remote UE 901 to discover the service provided by the UE-to-network is that the remote UE 901 first transmits a discovery request message to the UE-to-network relay 902 (step 923), and then the UE-to-network relay 902 delivers a service provided by UE-to-network relay 902 to remote UE 901 as a response message to the requested content. (step 925). The discovery request message may include and deliver the Layer 2 identifier of the remote UE 901, the application layer identifier, and additional information about which service information is requested, such as relay service code (dedicated relay session service or shared relay session service). Upon receiving the discovery request message, the UE-to-network relay 902 may deliver information on the service provided by the UE-to-network relay 902 to the remote UE 901 as a discovery response message in response to the request. The response message may include information such as a relay service code, a Layer 2 identifier of the UE-to-network relay 901, and an application layer identifier that provides a relay service. In addition, the relay service code may use a separate code to represent the relay session model. Alternatively, additional information specifying whether the relay session model, that is, a dedicated relay session service model or a share relay session model, may be transmitted to the remote UE 901 through a separate indicator.

In step 930, the remote UE 901 may determine a direct communication request (DCR) message transmission and DCR message parameters. After the remote UE 901 discovers the UE-to-network relay 902, the remote UE 901 may initiate a procedure for establishing a PC5 Link associated with the dedicated UE-to-network relay 902. The message of step 930 may include identifier information (e.g., SUP/SUCI or Layer 2 ID, etc.) of the remote UE 901, a relay service code (e.g., dedicated relay session service code, etc.), and information on parameters (e.g., S-NSSAI, DNN, PDU Session Type and SSC Mode, etc.) related to a PDU session preset in step 910.

The remote UE 901 may determine whether to request the UE-to-network relay session generation in a dedicated relay session mode or a shared relay session mode based on the content configured in step 910.

The remote UE 901 may determine the DCR based on the content delivered from the URSP when the DCR request is made. The remote UE 901 may determine PDU session parameters to be included in the DCR request message through information such as a status of the ProSe UE-to-network relay in the non-seamless offloading of the URSP, a dedicated relay session (DRSYshared relay session (SRS) model, and in the case of DRS, information such as a PDU session parameter (e.g., S-NSSAI, DNN, PDU session type, SSC mode, etc.).

The remote UE 901 may transmit a direct communication request (DCR) message to the relay UE 902 found in step 920. The DCR message includes the service code configured in the remote UE 901 in step 910 and may be delivered to the relay UE 902. The service code used may include a dedicated relay PDU session service code or a shared relay PDU session service code.

The DCR message may include a Layer 3 UE-to-network relay session generation indicator, and a dedicated relay session service code (DRSC) or a shared relay session service code (SRSC) provided from 5GC in step 910 or self-configured.

When the authentication of the remote UE (901) is prepared by the request of the application of the remote UE (901), user interaction or pre-configuration, and the capability of the remote UE (901), the remote UE 901 may include an indicator that authentication is possible to the DCR or an indicator that requests user authentication. The remote UE 901 may request IPv4, IPv6, IPv4v6, Ethernet, and Unstructured Data as a session type value in the DCR message.

In step 935, when the relay UE (i.e., UE-to-network relay) 902 receives the DCR message from the remote UE 901, in step 915, the relay UE may determine permission to use a dedicated UE-to-network session according to preconfigured information. If the UE-to-network relay use permission indicator according to network control is configured in the UE-to-network relay UE 902 in step 915, the UE-to-network relay 902 may perform a PDU session establishment procedure in order for the remote UE 901 to request permission to use the PDU session of the UE-to-network relay 902 in a dedicated mode. In this scenario, the UE-to-network relay 902 may transmit a request including a remote UE use permission request indicator, remote UE information (i.e., remote UE identification information, etc.), and an indicator that the PDU session of the UE-to-network relay 902 is used exclusively to the SMF 905.

The relay UE 902 may determine whether to permit use of the UE-to-network relay session. If the remote UE 901 requests the generation of a UE-to-network session including a relay service code, and the relay UE 902 is permitted to generate a UE-to-network session through information provisioned to the relay UE 902, the relay UE 902 may determine permission to use UE-to-network. If the information provisioned to the relay UE 902 includes an indicator indicating the use permission controlled by the 5GC, the relay UE 902 may determine whether to allow the use through the PDU session generation (or change) procedure in the 5GC. That is, when the SMF 905 of the 5GC determines permission to use the UE-to-network session of the remote UE 901, the relay UE 902 may determine whether to allow the use according to the decision.

The relay UE 902 may determine whether to use the existing PDU session or to generate a new PDU session in consideration of the following. For example, the relay UE 902 may determine whether to generate a PDU session based on the case that DRSC is included in among the contents of the DCR message received by the relay UE 902 from the remote UE 901, or the 5GC network control indicator is included in the authorization information received from 5GC in the relay UE 902 in step 915, or based on whether a PDU session matching the URSP information (in traffic descriptor) received from 5GC already exists in the relay UE 902 and whether the relay UE 902 provides an authentication relay function of the remote UE 901 in step 915. For example, if a request for generating a relay session (e.g., dedicated relay session service code (DRSC)) is included in a direct communication request (DCR) message received from the remote UE 901 and a PDU session corresponding to the DRSC is not generated, and if the relay UE 902 has already determined permission to use the relay session of the remote UE 901, the relay UE 902 may determine a request to generate a new PDU session. For another example, if a request for generating a relay session (e.g., DRSC) is included in a DCR message received from the remote UE 901 and a PDU session corresponding to the DRSC is not generated, and if it is necessary to obtain a use permission from 5GC for the relay UE 902 (e.g., if the network controlled authorization indicator is included in step 915), the relay UE 902 may determine a request to generate a PDU session. As another example, when receiving the PDU session parameter for the relay session in the DSR message from the remote UE 901, when a request is received in the shared relay session mode, and when a corresponding PDU session does not already exist in the relay UE 902, the relay UE 902 may request generation of a new PDU session.

When the relay UE 902 determines generation of a PDU session, the relay UE 902 may determine a PDU session parameter. The relay UE 902 may determine the PDU session parameter corresponding to the relay session by the traffic descriptor according to the URSP received in step 915 or the self-configuration of the relay UE 902. The PDU session parameter may be, for example, S-NSSAI, DNN, PDU session type, SSC mode, etc. When the relay UE 902 receives a DRSC request from the remote UE 901 and receives a PDU session parameter request from the remote UE 901, the relay UE 902 may determine a corresponding PDU session parameter. If the relay UE 902 determines generation of a PDU session, the relay UE may transmit a PDU session request message to the SMF 905. In the disclosure, the relay UE 902 has been used as the same concept as the UE-to-network relay UE.

In steps 940 and 945, a procedure for identifying subscriber information of the relay UE 902 may be performed. When the SMF 905 receives a PDU session establishment request including a request for permission to use the remote UE 901, the SMF 905 may obtain subscription information of the UE-to-network relay 902 from the UDM 906. The subscription information may include a list of allowed remote UE 901 identifier information, and profile information associated with the remote UE 901. This profile information may include the 5G user ID profile information described in FIG. 2. This profile information may include an authentication profile indicating whether secondary authentication is required. In order to obtain a profile for a specific remote UE 901, the SMF 905 may include the remote UE 901 identifier received in step 935 along with SUPI, which is identifier information of the UE-to-network relay 902, in a subscriber information message requesting the UDM 906 to be transmitted.

Subscriber information may include subscription information on whether to provide a relay service (UE-to-network relay PDU session), and more specifically, whether to provide a dedicated relay session service or a shared relay session service. In addition, a list of the remote UE 901 for the relay session service may be additionally written in the subscriber information. The relay session subscription information may include information on whether a dedicated relay service or a shared relay service is provided for each remote UE 901.

SMF 905 identifies the subscriber information of the relay UE 902. The SMF 905 may be configured by itself to perform a relay session use permission function for the remote UE 901 in the 5GC core when the relay session permission for the remote UE 901 is a network control method.

In step 950, an authentication procedure for the remote UE 901 may be performed.

Based on the authorization profile received in step 945, the SMF 905 may perform a secondary authentication/ authorization procedure. This procedure may be performed with the remote UE 901, DN-AAA 908 and SMF 905, and in this authentication procedure, the UE-to-network relay 902 may play a role of relaying an authentication message between the remote UE 901 and the SMF 905. The SMF 905 may initiate an authentication procedure with the remote UE 901 via the relay UE 902 in order for the remote UE 901 to determine permission to use the relay session. The SMF 905 may initiate an authentication procedure when the relay UE 902 performs network control, when the relay function of the authentication protocol for authentication of the remote UE 901 is supported, and when the subscriber information received from the UDM 906 or the operator policy information received from the PCF 907 is set to require authentication.

In steps 960 and 965, the SMF 905 may perform a permission procedure to use the relay session of the remote UE 901. The SMF 905 receives a policy and charging control (PCC) rule for the PDU session of the UE-to-network relay 902 supporting the remote UE 901 from the PCF 907 (step 965). In order for the SMF 905 to receive the policy for the remote UE 901, the SMF 905 may transmit identification information of the remote UE 901 to the PCF 907 (step 960). The PCF 907 may deliver a policy and a profile for the remote UE 901 associated with the PDU session of the UE-to-network relay 902 to the SMF 905 (step 965). The SMF 905 may receive the policy for the remote UE 901 and the SMF 905 may identify whether the remote UE 901 can use the corresponding PDU session.

When a dedicated relay service is provided in the profile for the remote UE 901, a separate profile for the remote UE 901 may be managed in subscriber information or policy information of the remote UE 901 managed by the PCF 907. The SMF 905 may request a separate profile database for the remote UE 901 to identify the profile for the remote UE 901, and receive subscriber information on the PDU session parameter for the remote UE 901.

When the SMF 905 receives the network controlled relay session authorization configured from the PCF 907, the SMF 905 may perform a relay session permission function for the remote UE 901.

In step 970, the SMF 905 may determine permission to use the relay session of the remote UE 901 through self-configured information or identification of subscriber information. Identification of such subscriber information may be determined through the UDM 906 or information received from the PCF 907. Alternatively, the SMF 905 may transmit some information included in the PDU session request to the PCF 907 to request the PCF 907 to determine whether to permit the use of the relay session, and the PCF 907 may determine whether to permit the use of the relay session and deliver the determined result to the SMF 905.

The SMF 905 may determine whether the remote UE 901 is permitted to use the PDU session of the UE-to-network relay according to profile information for the subscriber information and the remote UE (901) received from the UDM (906) in step 945, a result of the authentication performed in step 950, and a policy for the remote UE 901 associated with the UE-to-network relay session received from the PCF 907 in step 965. The SMF 905 may determine whether the requested PDU session parameter (e.g., S-NSSAI, DNN, PDU session type, etc.) is included in the profile of the remote UE 901, and determine whether to approve the request.

In step 975, if the use permission determined by the SMF 905 in step 970 is successful, the SMF may transmit the UE-to-network relay PDU session generation approval message to the UE-to-network relay 902 together with the use permission approval result. If the use permission is not successful, the SMF 905 may include the reason for not being approved in the PDU session grant rejection message and deliver it to the UE-to-network relay 902.

In step 975, when the remote UE 901 receives information that permission to use the dedicated PDU session provided by the UE-to-network relay 902 and the generation of the PDU session is successful, in step 980, the UE-to-network relay 902 may successfully perform generation of the PC5 link. If the remote UE 901 has failed in permission to use the UE-to-network relay session, the UE-to-network relay 902 may reject generation of the PC5 link.

In step 985, when the UE-to-network relay 902 performs a separate IP allocation procedure such as dynamic host configuration protocol (DHCP) or IPv6 stateless address autoconfiguration (SLAAC), this procedure may be performed.

In step 990, the UE-to-network relay 902 may report to the SMF 905 including the assigned IPv6 address or the range of TCP/UDP port addresses assigned to the remote UE 901 in case of IPv4, when using NAT (network address translation), and the Ethernet MAC address of remote UE 901 when using Ethernet to the SMF 905 in remote UE information.

Sixth Embodiment

The sixth embodiment will be described through the procedure of FIG. 10. This embodiment describes a use permission operation for a remote UE in the case of the shared relay session model described in FIG. 8.

The operation of this embodiment largely coincides with that of the fifth embodiment, and unless otherwise specified, it may be understood that the part specified as the dedicated relay session service code, the dedicated relay session, or the dedicated relay session model in the fifth embodiment is replaced with the shared relay session service code, the shared relay session, or the shared relay session model in this embodiment, respectively.

Irrespective of this, the parts that are different from the fifth embodiment or need to be supplemented with the fifth embodiment are specified below for each individual procedure.

Figure 10:
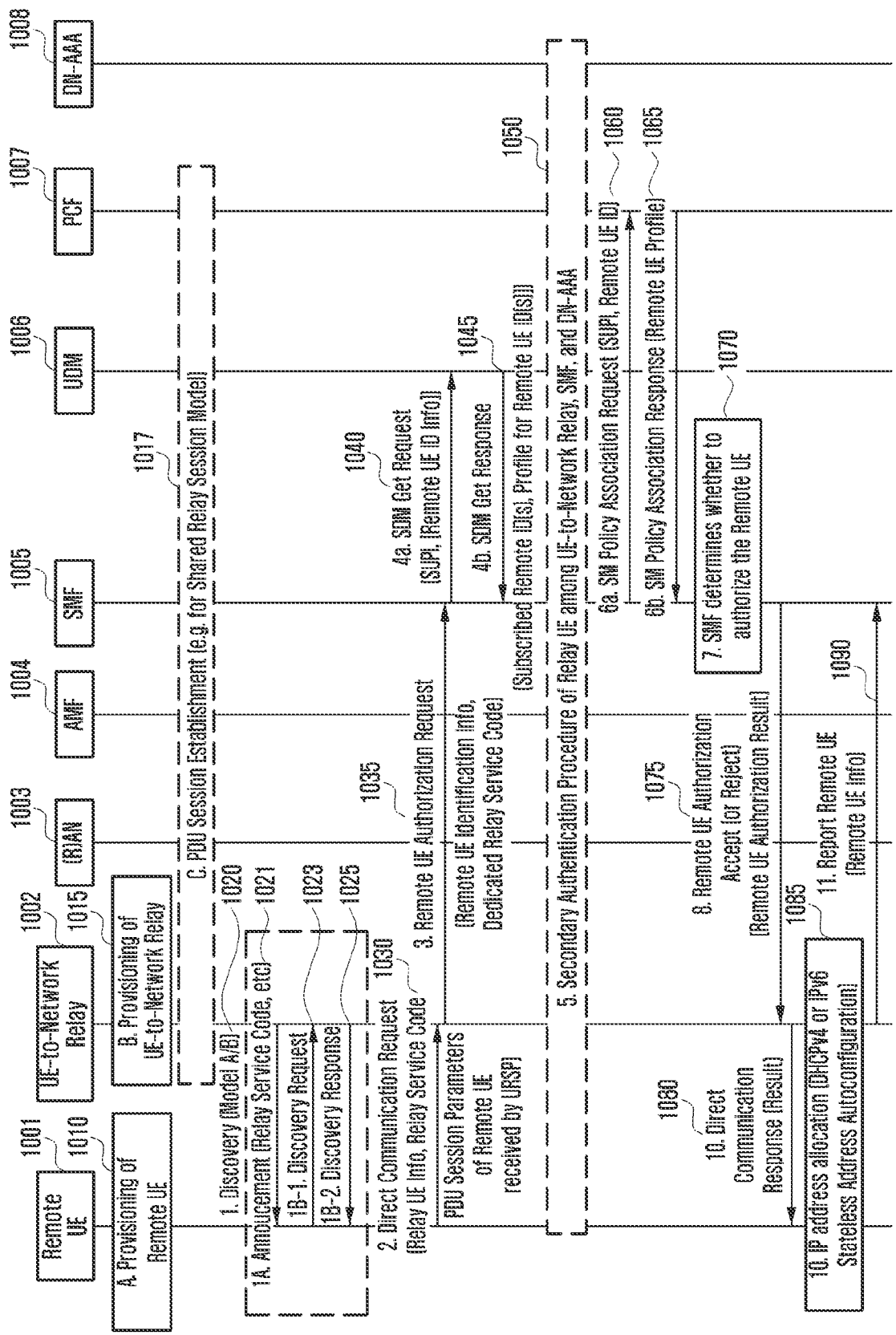
FIG. 10 illustrates an example of a use permission operation for a remote UE in the case of a shared relay session model according to an embodiment of the disclosure.

FIG. 10 illustrates an example of a use permission operation for a remote UE in the case of a shared relay session model according to an embodiment of the disclosure.

Referring to FIG. 10, steps 1010 and 1015 are the same as steps 910 and 915 of FIG. 9 related to the fifth embodiment except that all contents corresponding to a dedicated relay session are replaced with a shared relay session. In addition, in this embodiment, step 1017 may be performed. Based on the information set in advance in step 1015, the UE-to-network relay 1002 may generate a PDU session in advance as a shared session model in step 1017.

Step 1020 is the same as step 920 illustrated in FIG. 9. However, the dedicated relay may be understood as being replaced with the shared relay.

Step 1030 is the same as step 930 illustrated in FIG. 9. However, the dedicated relay may be understood as being replaced with the shared relay.

When the relay UE (i.e., UE-to-network relay) 1002 receives the DCR message in step 1030 from the remote UE 1001, according to the information configured in advance in step 1015, the relay UE 1002 may determine permission to use the common UE-to-network session in step 1035. If the UE-to-network relay use permission indicator according to network control is set in the UE-to-network relay UE 1002 in step 1015, the UE-to-network relay 1002 may perform a PDU session creation procedure in order for the remote UE 1001 to request permission to use the PDU session of the UE-to-network relay 1002 in a public mode. In this scenario, the UE-to-network relay may transmit a request, including an indicator that remote UE use permission request indicator, remote UE 1001 information (i.e., remote UE identification information, etc.), and the PDU session of the UE-to-network relay 1002 are used in common, to the SMF 1005.

A message delivered by the UE-to-network relay 1002 to the SMF 1005 in this procedure may be transmitted while being included in a PDU session change request message. In this case, the PDU session change request message may include a remote UE authorization request indicator.

Steps 1040 to 1065 are the same as steps 940 to 965 illustrated in FIG. 9. However, the dedicated relay may be understood as being replaced with the shared relay.

Step 1070 is the same as step 7075 illustrated in FIG. 9. However, permission to use the PDU session parameter is not applied in this embodiment.

If the use permission determined by the SMF 1005 in step 7070 is successful, in step 1075, the SMF 1005 may transmit a remote UE authorization response message to the UE-to-network relay 1002 together with the use authorization approval result. If the use authorization is not successful, the SMF 1005 may include the reason not approved in the remote UE authorization response message to the UE-to-network relay 1002. This message may be delivered together with the PDU session modification command message.

In step 1075, when the remote UE 1001 receives the information that the permission to use the public PDU session provided by the UE-to-network relay 1002 is successful, in step 1080, the UE-to-network relay 1002 may successfully perform generation of the PC5 link. If the remote UE 1001 fails to obtain permission to use the UE-to-network relay session, the UE-to-network relay 1002 may reject generation of the PC5 link.

Steps 1085 to 1090 are the same as steps 985 to 990 described with reference to FIG. 9. However, the dedicated relay may be understood as being replaced with a shared relay.

Figure 11:
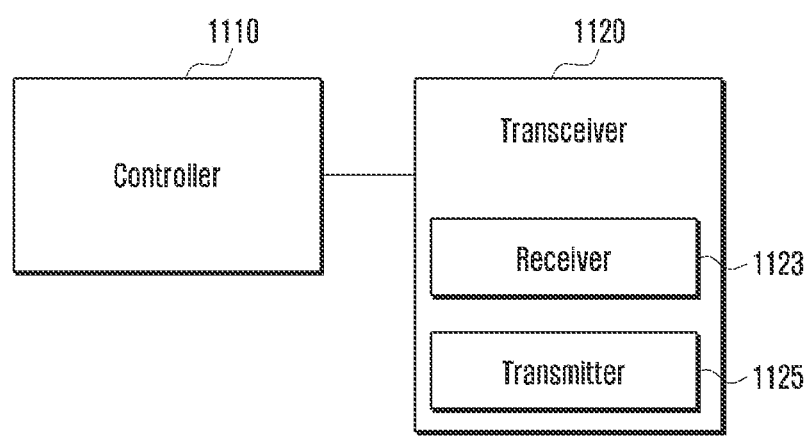
FIG. 11 is a diagram illustrating the configuration of a UE according to the disclosure.

FIG. 11 is a diagram illustrating the configuration of a UE according to the disclosure.

Referring to FIG. 11, the UE according to an embodiment of the disclosure may include a transceiver 1120 and a controller 1110 controlling overall operations of the UE. In addition, the transceiver 1120 may include a transmitter 1121 and a receiver 1123.

The transceiver 1120 may transmit/receive signals to and from other network entities.

The controller 1110 may control the UE to perform any one of the above-described embodiments. The controller 1110 and the transceiver 1120 do not necessarily have to be implemented as separate modules, and may be implemented as a single component in the form of a single chip. In addition, the controller 1110 and the transceiver 1120 may be electrically connected. In addition, for example, the controller 1110 may be a circuit, an application-specific circuit, or at least one processor. In addition, the operations of the UE may be realized by providing a memory device storing the corresponding program code in an arbitrary component in the UE.

Figure 12:
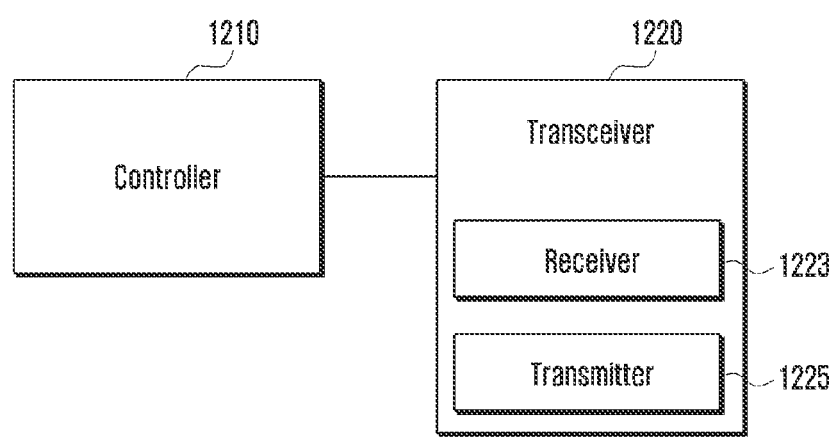
FIG. 12 is a diagram illustrating the configuration of a network entity according to the disclosure.

FIG. 12 is a diagram illustrating the configuration of a network entity according to the disclosure.

The network entity of the disclosure is a concept including a network function according to system implementation.

Referring to FIG. 12, the network entity according to an embodiment of the disclosure may include a transceiver 1220 and a controller 1210 controlling overall operations of the network entity. In addition, the transceiver 1220 may include a transmitter 1121 and a receiver 1123.

The transceiver 1220 may transmit/receive signals to and from other network entities.

The controller 1210 may control the network entity to perform any one of the above-described embodiments. The controller 1210 and the transceiver 1220 do not necessarily have to be implemented as separate modules, and may be implemented as a single component in the form of a single chip. In addition, the controller 1210 and the transceiver 1220 may be electrically connected. In addition, for example, the controller 1210 may be a circuit, an application-specific circuit, or at least one processor. In addition, the operations of the network entity may be realized by providing a memory device storing the corresponding program code in an arbitrary component in the network entity.

The network entity may be any one of a base station (RAN), an AMF, a SMF, a UPF, a PCF, an NF, an NEF, an NRF, an NSSF, a UDM, a UDR, an AF, a DN, an AUSF, a SCP, a UDSF, a context storage, an OAM, an EMS, an AAA-P, and an AAA-H.

It should be noted that the configuration diagrams illustrated in FIGS. 1 to 12, control/data signal transmission methods, operation procedures, and configuration diagrams are not intended to limit the scope of the disclosure. That is, all components, entities, or steps of operation described in FIGS. 1 to 12 should not be construed as essential components for implementation of the disclosure, but even including some components, it may be implemented within a range that does not impair the essence of the disclosure.

The operations of the base station or the UE described above may be realized by providing a memory device storing the corresponding program code in an arbitrary component in the base station or the UE device. That is, the controller of the base station or the UE device may execute the above-described operations by reading and executing the program code stored in the memory device by a processor or a central processing unit (CPU).

The various components and modules of the entity, base station or UE device described in the disclosure may be operated using hardware circuits such as, for example, a combination of complementary metal oxide semiconductor-based logic circuits, firmware, software and/or hardware, and firmware and/or software embedded in machine-readable media. As an example, various electrical structures and methods may be implemented using electrical circuits such as transistors, logic gates, and application-specific semiconductors.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method performed by a network exposure function (NEF) in a wireless communication system, the method comprising:
receiving, from an application function (AF), a first request related to a user equipment route selection policy (URSP) including user identification information, a single network slice selection assistance information (S-NSSAI), a data network name (DNN) and an event notification information for delivery of the URSP;

transmitting, to a unified data management (UDM), a second request for authorization of the user profile information related to the URSP, wherein the second request includes the user identification information;

receiving, from the UDM, an authorization result for the first request related to the URSP; and transmitting information for the URSP based on the first request.

2. The method of claim 1, wherein the first request includes subscription information for notification of an outcome of the first request.

3. The method of claim 1, further comprising:

receiving, from a policy control function (PCF), the outcome of the first request; and transmitting, to the AF, the outcome of the first request.

4. A network exposure function (NEF) in a wireless communication system, the NEF comprising:

a transceiver; and a controller configured to:

receive, from an application function (AF), a first request related to a user equipment route selection policy (URSP) including user identification information, a single network slice selection assistance information (S-NSSAI), a data network name (DNN) and an event notification information for delivery of the URSP, transmit, to a unified data management (UDM), a second request for authorization of the user profile information related to the URSP, wherein the second request includes the user identification information, receive, from the UDM, an authorization result for the first request related to the URSP, and transmit information for the URSP based on the first request.

5. The NEF of claim 4, wherein the first request includes subscription information for notification of an outcome of the first request.

6. The NEF of claim 4, wherein the controller is further configured to:

receive, from a policy control function (PCF), the outcome of the first request, and transmit, to the AF, the outcome of the first request.

* * * * *